United States Patent
Karasawa et al.

(10) Patent No.: US 6,750,937 B2
(45) Date of Patent: Jun. 15, 2004

(54) ELECTRO-OPTICAL DEVICE, METHOD FOR MANUFACTURING THE SAME, AND PROJECTION DISPLAY APPARATUS HAVING AN ELECTRICALLY CONDUCTIVE SEALING MEMBER

(75) Inventors: Kazuki Karasawa, Suwa (JP); Kenya Ishii, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 09/988,039

(22) Filed: Nov. 16, 2001

(65) Prior Publication Data

US 2002/0080461 A1 Jun. 27, 2002

(30) Foreign Application Priority Data

Nov. 17, 2000 (JP) ........................... 2000-351394
Sep. 10, 2001 (JP) ........................... 2001-274141

(51) Int. Cl.[7] ................... G02F 1/1339; G02F 1/1345
(52) U.S. Cl. ................... 349/153; 349/155; 349/149; 349/190
(58) Field of Search ................... 349/153, 155, 349/149, 190

(56) References Cited

U.S. PATENT DOCUMENTS

| 5,973,763 | A | * | 10/1999 | Fujimura et al. | ............ | 349/156 |
| 6,335,779 | B1 | * | 1/2002 | Morii et al. | ................. | 349/155 |
| 2002/0109815 | A1 | * | 8/2002 | Hirakata et al. | ............ | 349/155 |

FOREIGN PATENT DOCUMENTS

| JP | A 62-89024 | 4/1987 |
| JP | 62-135813 | 6/1987 |
| JP | 04-324825 | 11/1992 |
| JP | 05-241183 | 9/1993 |
| JP | 06-082809 | 3/1994 |
| JP | A 6-138488 | 5/1994 |
| JP | A 6-230398 | 8/1994 |
| JP | A 11-64874 | 3/1999 |
| JP | A 11-119242 | 4/1999 |
| JP | A 11-202366 | 7/1999 |
| JP | 2000-89242 | 3/2000 |
| JP | 2000-199915 | 7/2000 |

* cited by examiner

*Primary Examiner*—Tarifur R. Chowdhury
(74) *Attorney, Agent, or Firm*—Oliff & Berridge PLC

(57) ABSTRACT

The invention provides an electro-optical device includes a first substrate and a second substrate sandwiching an electro-optical substance. The substrates are provided with a sealing material disposed between the substrates, for bonding the substrates to each other at a sealing region disposed along the peripheries of the substrates. The first substrate is provided thereon with pixel electrodes, wires extending from the inside of an image display region to the outside of the sealing region, and a vertically conducting pad disposed in the sealing region. The second substrate is provided thereon with an opposing electrode opposing the pixel electrodes and having a vertical conductor section opposing the vertically conducting pad. The sealing material includes an electrically conductive material at least in a portion of the sealing material disposed between the vertically conducting pad and the vertical conductor section, whereby the sealing material functions as a vertical conductor. With this arrangement, a configuration regarding the sealing material for bonding a pair of the substrates and vertical conduction between the pair of substrates can be simplified.

10 Claims, 13 Drawing Sheets

ELECTRO-OPTICAL DEVICE, METHOD FOR MANUFACTURING THE SAME, AND PROJECTION DISPLAY APPARATUS HAVING AN ELECTRICALLY CONDUCTIVE SEALING MEMBER

BACKGROUND OF THE INVENTION

1. Field of Invention

The present invention relates to an electro-optical device, such as a liquid crystal device, and a method for manufacturing the electro-optical device, in which an electro-optical substance is sandwiched by a pair of first and second substrates bonded to each other with a sealing material at the periphery of an image display region, and the first and second substrates are provided with a pair of electrodes, respectively, disposed on the faces of the first and second substrates, each opposing the electro-optical substance.

2. Description of Related Art

Currently, an electro-optical device generally includes pixel electrodes, thin-film transistors (TFTs) for switching the pixel electrodes, a TFT-arrayed substrate which is provided with wirings, such as data lines and scan lines connected to the TFTs, for supplying image signals and scan signals, respectively, and an opposing substrate opposing a surface of the TFT-arrayed substrate provided with the wirings and the like. The opposing substrate being provided with an opposing electrode on the entire surface of the opposing substrate, other than color filters, light-shielding films, and the like.

The TFT-arrayed substrate and the opposing substrate are bonded to each other by a sealing material at a sealing region disposed around an image display region. An electro-optical substance such as liquid crystal is sandwiched by the substrates. An electrically conductive vertically-conducting material is sandwiched by the substrates at vertically conducting regions (that is, vertically conductive pads or regions at corners of the opposing substrate) provided on the respective substrates at the outside of the sealing region. A wire provided on the TFT-arrayed substrate for applying potential to an opposing electrode either to be constant or to invert at a given frequency is electrically connected to the opposing electrode via the vertically conducting material. Display is performed by driving the electro-optical substance (for example, by changes of the orientation of the liquid crystal) at a part thereof associated with each pixel electrode corresponding to a pixel by generating driving voltage between the corresponding pixel electrode and the opposing electrode.

Technologies are disclosed in, for example, Japanese Unexamined Patent Application Publication Nos. 62-89024, 11-64874, and 11-202366, in which a sealing material is provided in a sealing region which encloses a liquid crystal layer and is disposed along the four sides of a substrate and a vertically conducting material is provided in vertically conducting regions at the four corners of the substrate. Although the sealing material generally includes a non-conductive photo-curing resin or the like and the vertically conducting material includes a conductive material, the sealing material used in the sealing region and the vertically conducting material used in the vertically conductive regions include a conductive material of the same type in the technology disclosed in above Japanese Unexamined Patent Application Publication No. 62-89024. Therefore, the sealing material and the vertically conducting material can be applied in one process, whereby manufacturing processes can be simplified.

When the above electro-optical device has a large image-display region having a diagonal of, for example, approximately 20 cm or greater, bead-like or fiber-like gap-forming members for controlling a gap between substrates are spread in an electro-optical substance such as liquid crystal which is disposed in the image display region (problems do not occur because the gap-forming members are not shown as images). On the other hand, when the electro-optical device has a small image-display region having a diagonal of, for example, approximately 2 cm or smaller, the gap-forming members for controlling the gap between the substrates are generally mixed in a sealing material (so that the gap-forming members are not shown as images).

SUMMARY OF THE INVENTION

However, since the sealing material used in the technology disclosed in above Japanese Unexamined Patent Application Publication No. 62-89024 is electrically conductive, there is a drawback in that the commercialization is very difficult because short-circuiting often occurs between wirings in the sealing region. When a non-conductive sealing material is used, non-conductive gap-forming members mixed in the sealing material do not cause short-circuits between wirings even when the gap-forming members break an insulation film formed on a TFT-arrayed substrate during being bonded, and are brought into contact with the wirings. However, the gap-forming members are electrically conductive, according to the technology disclosed in the above publication, therefore, short-circuiting between the wirings occurs due to the contact of the gap-forming members.

In the technology disclosed in above Japanese Unexamined Patent Application Publication No. 11-64874, it is described that the vertically conducting material must be disposed at a given distance from an end of a substrate in order to avoid short-circuiting between upper and lower substrates. In the technology disclosed in above Japanese Unexamined Patent Application Publication No. 11-202366, wires along the periphery of an image display region to vertically conducting regions disposed at the four corners of a substrate must be provided on the substrate at the outside of the image display region in order to apply potential evenly to the entire of an opposing electrode which has a relatively high electric resistance. Therefore, according to these publications, there is a problem in that it is fundamentally difficult to reduce the sizes of the substrates or increase the size of the image display region with respect to the sizes of the substrates because the vertically conducting regions must be disposed at the outside of the sealing region.

When the size of the vertically conducting region is reduced so as to reduce the sizes of the substrates or increase the size of the image display region, vertically conductive performance becomes less reliable. When the size of the sealing region is reduced so as to reduce the sizes of the substrates or increase the size of the image display region, bonding performance and control of the gap between the substrates become less reliable.

Accordingly, it is an object of the present invention to provide an electro-optical device and a method for manufacturing an electro-optical device, in which a configuration regarding a sealing material to bond a pair of substrates to each other and a vertically conducting material between the pair of substrates can be made simple, the reliability on vertical conduction can be improved, and the sizes of the substrates can be reduced or the size of an image display region can be increased with respect to the sizes of the substrates.

To these ends, according to an aspect of the present invention, an electro-optical device can include an electro-optical substance sandwiched by a pair of a first substrate and a second substrate, a sealing material disposed between the first substrate and the second substrate for bonding the first substrate and the second substrate to each other at a sealing region along the peripheries, in plan view, of the first substrate and the second substrate, and a plurality of pixel electrodes disposed on the first substrate and in an image display region which is enclosed, in plan view, by the sealing region. The electro-optical device can further include wires provided on the first substrate and extending from the inside of the image display region to the outside of the sealing region, a vertically conducting pad disposed in the sealing region, and an opposing electrode provided on the second substrate and opposing the pixel electrodes, the opposing electrode including a vertical conductor section which opposes the vertically conducting pad. At least one part of the sealing material, which is disposed between the vertically conducting pad and the vertical conductor section, includes an electrically conductive material.

In the electro-optical device according to the present invention, an image signal and the like are supplied to the pixel electrodes via the wires formed on the first substrate. In parallel to this, an opposing-electrode-potential signal for causing potential applied to the opposing electrode formed on the second substrate, either to be constant or to invert at a given frequency, and the like are supplied via the vertically conducting pad and the vertical conductor section. Therefore, a driving voltage is applied between the image electrode and the opposing electrode at each pixel in accordance with these signals, whereby the electro-optical substance between the image electrode and the opposing electrode is driven (for example, the orientation of liquid crystal is changed by the applied driving voltage) and electro-optical image display is performed.

In this case, a portion of the sealing material including a conductive material is disposed between the vertically conducting pad and the vertical conductor section, whereby the portion of the sealing material serves as a vertical conductor, the sealing material bonding the first and second substrates to each other at the sealing region. Since a vertically conducting region can be included in the sealing region, the sizes of substrates can be reduced or the size of an image display region can be increased with respect to the sizes of the substrates compared with the above-described known technologies in which a vertically conducting region is prepared outside a sealing region and a conductive vertical conductor is provided in the vertical conducting region in addition to a sealing material. That is, since it is not necessary to prepare a vertically conducting region separately from the sealing region, the area of the sealing region can be increased, whereby the substrates can be reliably bonded to each other. The configuration of the device and a method for manufacturing the device can be made simple with at least one part of the sealing material also functioning as a vertical conductor.

A risk of disconnection or short-circuiting of the wires underlying the vertically conducting pad which is an uppermost layer on the first substrate due to the sealing material (for example, a gap-forming member included therein) can be reduced with the vertically conducting pad being provided. When the size of the vertically conducting pad in the sealing region is increased, the vertically conducting pad becomes more reliable. Therefore, the opposing electrode can be stably driven by reliable vertical conduction, whereby block ghosts in finally displayed images can be reduced.

As a result, in the electro-optical device according to the present invention, a configuration regarding the sealing material and the vertically conducting pad can be made simple, reliability on the vertical conduction and bonding between the substrates can be improved, and the sizes of the substrates can be reduced or the size of the image display region can be increased with respect to the sizes of the substrates.

In the electro-optical device according to one embodiment of the present invention, the vertically conducting pad may occupy at least one of three given sides of the sealing region. With this arrangement, the vertically conducting pad can be made much larger than the island-shaped vertically conducting pads formed at the four corners of a substrate according to the above-described known technology, because the vertically conducting pad according to the present invention occupies one, two, or three sides of the sealing region, whereby much more reliable vertical conduction can be performed, and the opposing electrode can be driven stably. When the given sides are those sides at which the wires extending from the image display region to the outside of the sealing region are not provided or which are provided with wiring structures having a relatively high mechanical strength (that is, when an electrically insulative sealing material is disposed at a side other than the given sides), a risk of disconnection or short-circuiting of the wires, which underlie the sealing material, due to the sealing material can be reduced. By forming the vertically conducting pad in units of a side of the sealing region, a gap between the substrates can be easily controlled by including a gap-forming member in the sealing material.

The vertically conducting pad may be formed at at least one of the four sides of the sealing region at which an inlet for the electro-optical substance is not formed. With this arrangement, the vertically conducting pad is provided at at least one of the sides at which an inlet for the electro-optical substance such as liquid crystal is not provided, and is not provided at the remaining sides at one of which the inlet is provided. Therefore, when an electrically insulative sealing material is disposed at the side at which the inlet is provided, a risk of disconnection or short-circuiting of the wires underlying the sealing material can be reduced. For example, when the wires are provided extending from the image display region to the outside of the sealing region at the side at which the inlet is formed, the disconnection or the short-circuit can be more advantageously reduced.

In the electro-optical device according to another embodiment of the present invention, the sealing material may include a gap-forming member mixed therein for controlling a gap between the first substrate and the second substrate. With this arrangement, the gap between the substrates can be controlled by the gap-forming member. Therefore, displayed images are prevented from deterioration due to the gap-forming member spread in an electro-optical substance of a small electro-optical device. In the electro-optical device according to the present invention, a risk of the disconnection or short-circuiting caused by the gap-forming member in the sealing region can be advantageously reduced even when the gap-forming member is mixed in the sealing material.

The gap-forming member may include electrically conductive particles at least in a portion of the sealing material disposed between the vertically conducting pad and the vertical conductor section. With this arrangement, the conductivity in the sealing member can be improved in a portion of the sealing material disposed between the vertically conducting pad and the vertical conductor section, whereby the portion of the sealing material serves as a vertical conductor.

In this case, the electrically conductive particles may be metal-plated bead-like or fiber-like particles. With this arrangement, a portion of the sealing material disposed between the vertically conducting pad and the vertical conductor section can serve as a vertical conductor with the electrically conductive particles as a conductive gap-forming member being included, the electrically conductive particles being formed of, for example, nickel-gold-plated $SiO_2$ balls, $SiO_2$ fibers, or the like.

According to another embodiment of the invention, at least one part of the sealing material, which is disposed between the vertically conducting pad and the vertical conductor section, may include a powdered metal mixed in the sealing material.

The conductivity in a part of the sealing material, which is disposed between the vertically conducting pad and the vertical conductor section, can be improved, whereby the part of the sealing material serves as a vertical conductor. It should be understood that the gap-forming member including electrically conductive particles described above may be mixed in the sealing material in addition to the powdered metal.

According to still another embodiment of the invention, the sealing material may include the electrically conductive material in the entire sealing region. By providing an entire sealing region serving as a vertical conductor, the configuration of the device and manufacturing processes of the device can be simplified.

According to another embodiment of the invention, the sealing material may include the electrically conductive material at least in a portion of the sealing region opposing the vertically conducting pad and include an electrically insulative material in the portion of the sealing region not opposing the vertically conducting pad. When the portion of the sealing region opposing the vertically conducting pad serves as a vertical conductor, the configuration of the device and manufacturing processes of the device can be made simple. Since the portion of the sealing material not opposing the vertically conducting pad includes an electrically insulative material, a risk of disconnection and short-circuiting of the laminated wires underlying the portion of the sealing material caused from the portion of the sealing material can be reduced.

In the electro-optical device according to another embodiment of the present invention, a surface of the vertically conducting pad formed in the sealing region may be disposed on the same plane as that of a surface of an insulation film formed in the sealing region.

The surface of the vertically conducting pad formed in the sealing region is planarized, such that the surface is disposed on the same plane as that of the surface of the insulation film formed in the sealing region, by, for example, CMP (chemical mechanical polishing) or with the vertically conducting pad being embedded in a groove formed in the substrate or an interlayer insulation layer. Therefore, the gap between the substrates can be accurately controlled when the gap is controlled by using a gap-forming member included in the sealing material disposed in the planarized sealing region.

In the electro-optical device according to still another embodiment of the present invention, a surface of the vertically conducting pad formed in the sealing region may be disposed at a level differing from the level of a surface of an insulation film formed in the sealing region, and the sealing material may include gap-forming members having diameters differing from each other in accordance with the size of a gap between the first substrate and the second substrate, the size of the gap varying between a portion of the sealing region in which the vertically conducting pad is formed and another portion of the sealing region in which the insulation film is formed so as to control the gap between the first substrate and the second substrate.

With this arrangement, since the vertically conducting pad is not planarized in the sealing region, it is difficult to accurately control the gap between the substrates according to projection and withdrawal of the vertically conducting pad when gap-forming members having a diameter the same as each other are included in the sealing material. Moreover, a risk of disconnection and short-circuiting of the wires caused by the gap-forming members in contact with the projection formed in the sealing region is increased. However, according to this embodiment of the present invention, gap-forming members, which have diameters differing from each other according to the gap between the substrates which varies between the portion of the vertically conducting pad and the portion of the insulative film, are included in the sealing material.

When the gap in the sealing region provided with the vertically conducting pad is smaller (that is, when the vertically conducting pad projects in the sealing region), the diameter of the gap-forming member disposed on the vertically conducting pad is set smaller than that of the gap-forming member which is not disposed on the vertically conducting pad. On the other hand, when the gap in the sealing region provided with the vertically conducting pad is greater (that is, when the vertically conducting pad withdraws in the sealing region), the diameter of the gap-forming member disposed on the vertically conducting pad is set greater than that of the gap-forming member which is not disposed on the vertically conducting pad. Therefore, the height of the tops of the gap-forming members disposed in the gap of which the size is not equal can become the same by varying the diameters of the gap-forming members, whereby the gap between the substrates can be accurately controlled by the gap-forming members included in the sealing material. Moreover, the risk of disconnection and short-circuiting of the wires caused by the gap-forming members in contact with the projection formed in the sealing region can be reduced.

The sealing material including the gap-forming member which has a smaller diameter corresponding to the gap of a smaller size may be disposed in a part of the sealing region associated with the gap of a larger size and in the vicinity of a boundary, at which the size of the gap varies, between the portion of the sealing region in which the vertically conducting pad is formed and the other portion of the sealing region in which the insulation film is formed.

With this arrangement, a risk in that the gap-forming member having a larger diameter moves to the side of a smaller gap from the side of a larger gap between the substrates across the boundary disposed in the sealing region at which the size of the gap varies can be reduced. That is, a risk of disconnection or short-circuiting of the wires caused by the gap-forming member having larger diameters for larger gap coming in contact with the smaller gap portion can be reduced. It is not a problem of great importance or does not present any practical problem at all that the gap-forming member having a smaller diameter moves to the side of the larger gap from the side of the smaller gap between the substrates across the boundary disposed in the sealing at which the size of the gap varies.

In the electro-optical device according to still another embodiment of the invention, the sealing material may include one of a thermosetting resin and a thermo-photo-curing resin. With this arrangement, reliable bonding between the substrates can be performed by thermo-curing the sealing material, which includes a thermosetting resin or thermo-photo-curing resin, in a manufacturing process of the electro-optical device. It is slightly difficult (although it is not impossible) to cure a sealing material including a photo-curing resin because it is slightly difficult to apply light due to interference by the vertically conducting pad which is disposed at the side of the first substrate in the sealing region. Therefore, it is advantageous to use such a sealing material including a thermosetting resin or a thermo-photo-curing resin as the sealing material according to the present invention.

According to another aspect of the present invention, a method for manufacturing an electro-optical device, by which the above-described electro-optical device according to the present invention is manufactured, can include the steps of forming the pixel electrodes, the wires, and the vertically conducting pad on the first substrate; forming the opposing electrode on the second substrate, and bonding the first substrate and the second substrate to each other with the sealing material.

In the method for manufacturing an electro-optical device, according to the present invention, the first substrate provided with the vertically conducting pad formed thereon and the second substrate provided with the opposing electrode including a vertical conductor section are bonded to each other with the sealing material, and simultaneously, a vertical conductor which vertically connects between the vertically conducting pad and the vertical conductor section can be formed with a conductive portion of the sealing material. That is, manufacturing processes can be made simple compared with a manufacturing method in which the steps of bonding of the substrates and forming the vertical conductor are individually performed. The electro-optical device according to the present invention can be relatively easily manufactured in such simplified manufacturing processes.

The method for manufacturing an electro-optical device, according to one embodiment of the present invention, may further include the step of planarizing the vertically conducting pad.

The gap between the substrates can be accurately controlled by using the sealing material including the gap-forming member disposed in the planar sealing region which is realized by, for example, performing CMP on the vertically conducting pad or embedding the same in a groove formed in the substrate or an interlayer insulation film.

In the method for manufacturing an electro-optical device, according to another embodiment of the present invention, the step of bonding with the sealing material may include the steps of applying the sealing material including a gap-forming member having a first diameter to a portion of the sealing region opposing the vertically conducting pad by using a dispenser, and applying the sealing material including another gap-forming member having a second diameter to another portion of the sealing region not opposing the vertically conducting pad by using another dispenser, the second diameter differing from the first diameter.

The sealing material including the gap-forming member which has a first diameter is applied by using one dispenser to a portion of the sealing region opposing the vertically conducting pad and the sealing material including the gap-forming member which has a second diameter is applied by using another dispenser to another portion of the sealing region not opposing the vertically conducting pad. Therefore, an electro-optical device can be relatively easily manufactured by using the method according to the present invention, in which the gap-forming members having diameters differing from each other in accordance with a projection and withdrawal of the sealing region produced due to the vertically conducting pad.

In the method for manufacturing an electro-optical device, according to still another embodiment of the present invention, the step of bonding with the sealing material may include the steps of applying the sealing material including an electrically conductive gap-forming member to a portion of the sealing region opposing the vertically conducting pad by using a dispenser, and applying the sealing material including an electrically insulative gap-forming member to another portion of the sealing region not opposing the vertically conducting pad by using another dispenser.

The sealing material including the electrically conductive gap-forming member is applied by using one dispenser to a portion of the sealing region opposing the vertically conducting pad and the sealing material including an electrically insulative gap-forming member is applied by using another dispenser to another portion of the sealing region not opposing the vertically conducting pad. Therefore, an electro-optical device can be relatively easily manufactured by using the method according to the present invention, in which vertical connection is formed with the electrically conductive gap-forming member disposed only in the portion provided with the vertically conducting pad, and disconnection or short-circuiting of the wires caused by the gap-forming member is avoided.

In the method for manufacturing an electro-optical device, according to another embodiment of the present invention, the step of bonding with the sealing material can include the step of heating the sealing material including one of a thermosetting resin and a thermo-photo-curing resin.

The substrates can be bonded to each other with heat applied to the sealing material including a thermosetting resin or a thermo-photo-curing resin. That is, the substrates can be reliably bonded to each other by the sealing material.

Although according to the present invention, it is difficult to cure a sealing material including a photo-curing resin because application of light to the sealing region at the first substrate side is difficult because of interference by the vertically conducting pad, the sealing material including a photo-curing resin may be used, in which the photo-curing resin can be cured with light applied thereto while masking an image display region, thereby avoiding deterioration of the electro-optical substance due to application of the light.

According to a further aspect of the present invention, a projection display apparatus can include a light source, a light valve including the electro-optical device according to the present invention, a light-guide member for guiding light generated by the light source to the light valve, and a projection optical element for projecting the light modulated by the light valve.

Features and further advantages of the present invention will become apparent from preferred embodiments described below.

BRIEF DESCRIPTION OF THE DRAWINGS

The invention will be described with reference to the accompanying drawings, in which like elements are referred to with like numerals, and wherein.

DETAILED DESCRIPTION OF PREFERRED EMBODIMENTS

Embodiments according to the present invention are described below with reference to the drawings. In the following embodiments, a liquid crystal device is used as an electro-optical device according to the present invention.

The overall configuration of an electro-optical device according to an embodiment of the present invention is described below with reference to FIGS. 1 to 3. A TFT-active-matrix-drive-type driving-circuit-built-in liquid crystal device is used as the electro-optical device according to the present embodiment.

Figure 1:
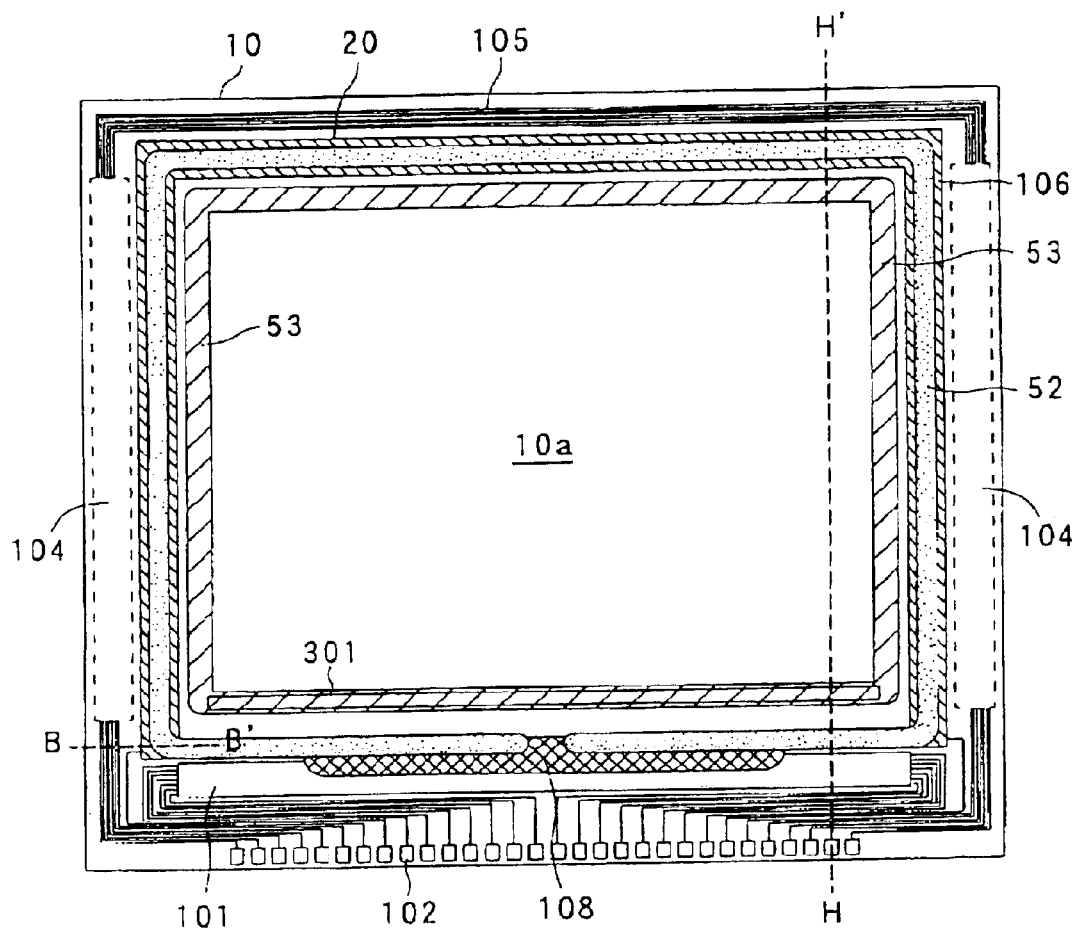
FIG. 1 is a plan view, from the side of an opposing substrate, of a TFT-arrayed substrate and components formed on the TFT-arrayed substrate of an electro-optical device according to an embodiment of the present invention.

FIG. 1 is a plan view from the side of an opposing substrate of a TFT-arrayed substrate and components formed on the TFT-arrayed substrate. FIG. 2 is a sectional view along line H–H' of FIG. 1. FIG. 3 is a plan view of a vertically conducting pad and a sealing material formed on the TFT-arrayed substrate and extracted from the components shown in FIG. 1.

Figure 2:
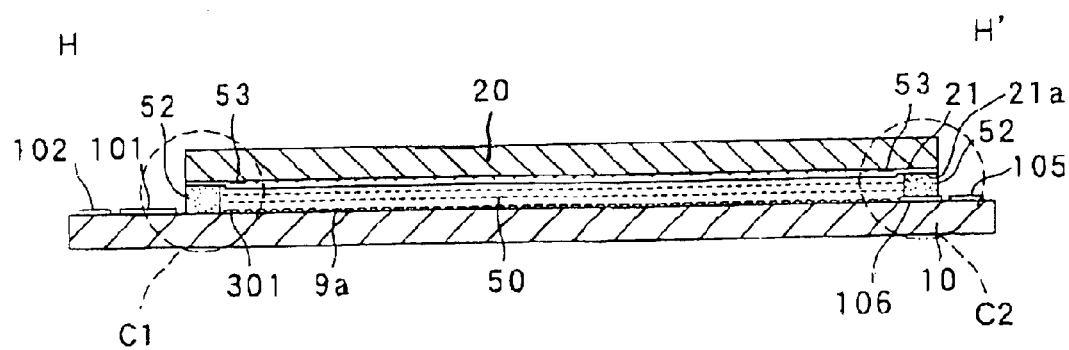
FIG. 2 is a sectional view along line H–H' of FIG. 1.

In the electro-optical device shown in FIGS. 1 and 2, according to the present embodiment, a TFT-arrayed substrate 10 and an opposing substrate 20 are disposed opposing each other. A liquid crystal layer 50 is sealed between the TFT-arrayed substrate 10 and the opposing substrate 20. The TFT-arrayed substrate 10 and the opposing substrate 20 are bonded to each other with a sealing material 52 applied to a sealing region disposed around an image display region 10a.

According to the present embodiment, the sealing material 52 includes, for example, a thermosetting resin, a thermo-photo-curing resin, a photo-curing resin, an ultraviolet-curing resin, or the like so as to bond the substrates to each other. The sealing material 52 is applied to the TFT-arrayed substrate 10 in a manufacturing process and is cured by being applied with heat, heat and light, light, ultraviolet, or the like. The sealing material 52 also serves as a vertical conductor by being sandwiched by a vertical conducting pad 106 disposed in the sealing region on the TFT-arrayed substrate 10 and a vertical conductor section 21a positioned on a margin of the opposing substrate 20. That is, the TFT-arrayed substrate 10 and the opposing substrate 20 are electrically connected to each other via the sealing material 52.

The sealing material 52 includes gap-forming members mixed therein, such as glass fibers or glass beads, so as to maintain a given distance between the substrates (a gap between the substrates). The electro-optical device according to the present embodiment is small-sized and is suitable to serve as a light valve for a projector for enlarging images. When the electro-optical device is a large-sized liquid crystal device such as a liquid crystal display or a liquid crystal television set which performs an equi-magnification display, the gap-forming members may be included in the liquid crystal layer 50. According to the present embodiment in particular, the gap-forming members include minute electrically-conductive particles disposed at least in a portion of the sealing material 52 which is provided between the vertically conducting pad 106 and the vertical conductor section 21a and serves as a vertical conductor. More particularly, the gap-forming members include, for example, nickel-gold-plated bead-shaped or fiber-shaped $SiO_3$ particles. The configurations, features, and advantages of the sealing material 52 and the vertically conducting pad 106 are described in greater detail below with reference to FIGS. 3 to 5 and 7 to 13.

In FIGS. 1 and 2, a light-shielding frame 53 which defines the image display region 10a is provided at the opposing substrate 20 side and parallel to the inner side of the sealing region which is provided with the sealing material 52. It should be noted that the frame 53 may be provided at the side of the TFT-arrayed substrate 10. A data-line-driving circuit 101 and external-circuit-connecting terminals 102 are provided along one side of the TFT-arrayed substrate 10 and outside the sealing region, applied with the sealing material 52, of the peripheral region around the image display region, and a scan-line-driving circuit 104 is provided along two sides each adjacent the one side of the TFT-arrayed substrate 10. The remaining side of the TFT-arrayed substrate 10 is provided with a plurality of wirings 105 for connecting between two sections of the scan-line-driving circuit 104 disposed along the two sides of the TFT-arrayed substrate 10.

In FIG. 2, the TFT-arrayed substrate 10 is provided with an orientation film formed on pixel electrodes 9a already provided with TFTs for switching pixels, scan lines, data lines, and the like. The opposing substrate 20 is provided with an opposing electrode 21 and the like, and another orientation film as an uppermost layer. The liquid crystal layer 50 includes, for example, one type or several types of nematic liquid crystal and forms a given orientation of the liquid crystal between a pair of the orientation films.

According to the present embodiment, a sampling circuit 301 can be provided in a region between the frame 53 and the TFT-arrayed substrate 10. The sampling circuit 301 samples image signals on image-signal lines in accordance with a sampling-circuit-driving signal from the data-line-driving circuit 101 and supplies the image signals to the data lines.

Figure 3:
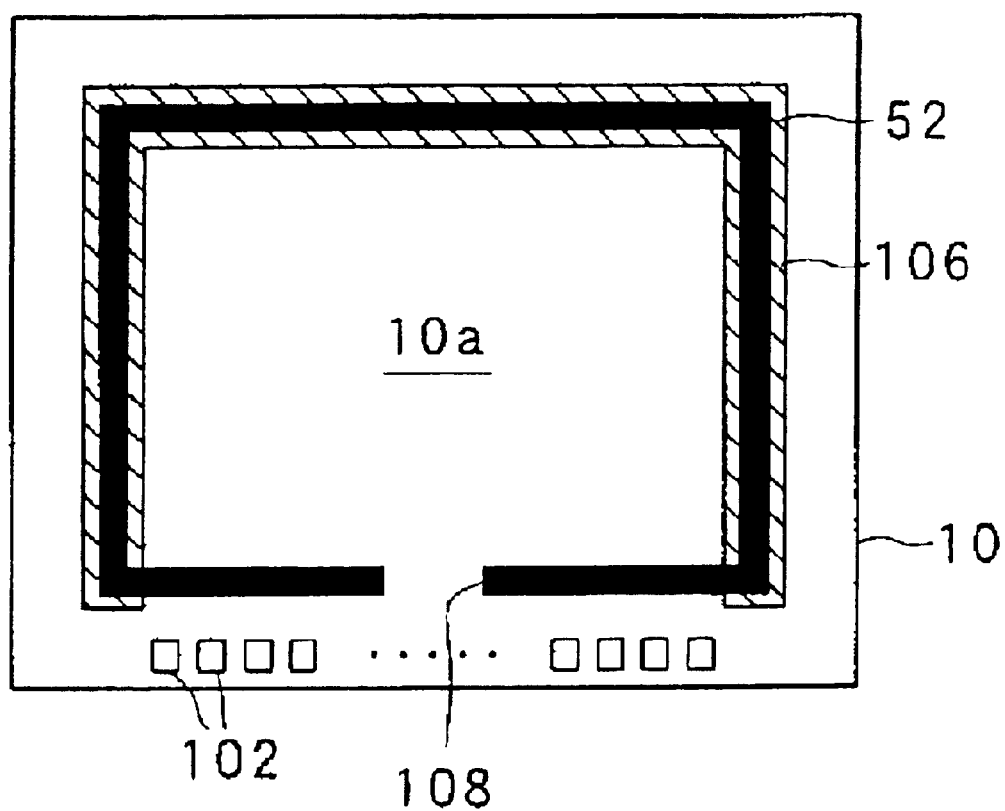
FIG. 3 is a plan view of a vertically conducting pad and a sealing material formed on the TFT-arrayed substrate and extracted from the components shown in FIG. 1.
Figure 4:
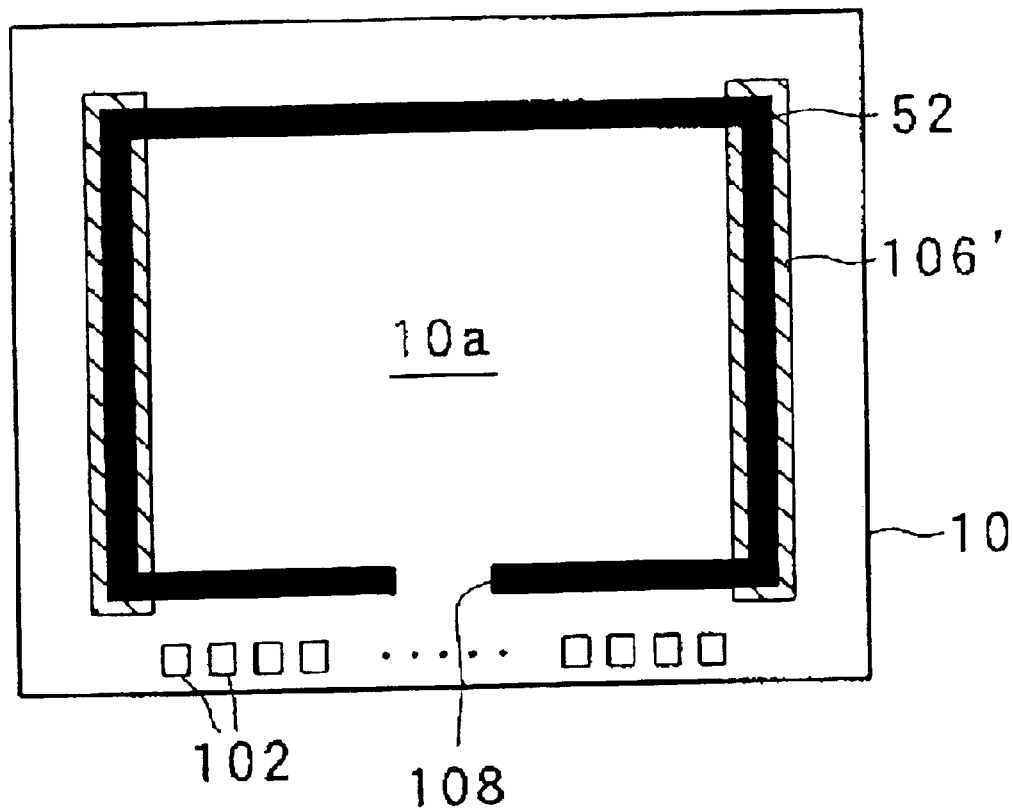
FIG. 4 is a plan view, in the same manner as in FIG. 3, of another example of the vertically conducting pad and the sealing material which can be used in the embodiment.
Figure 5:
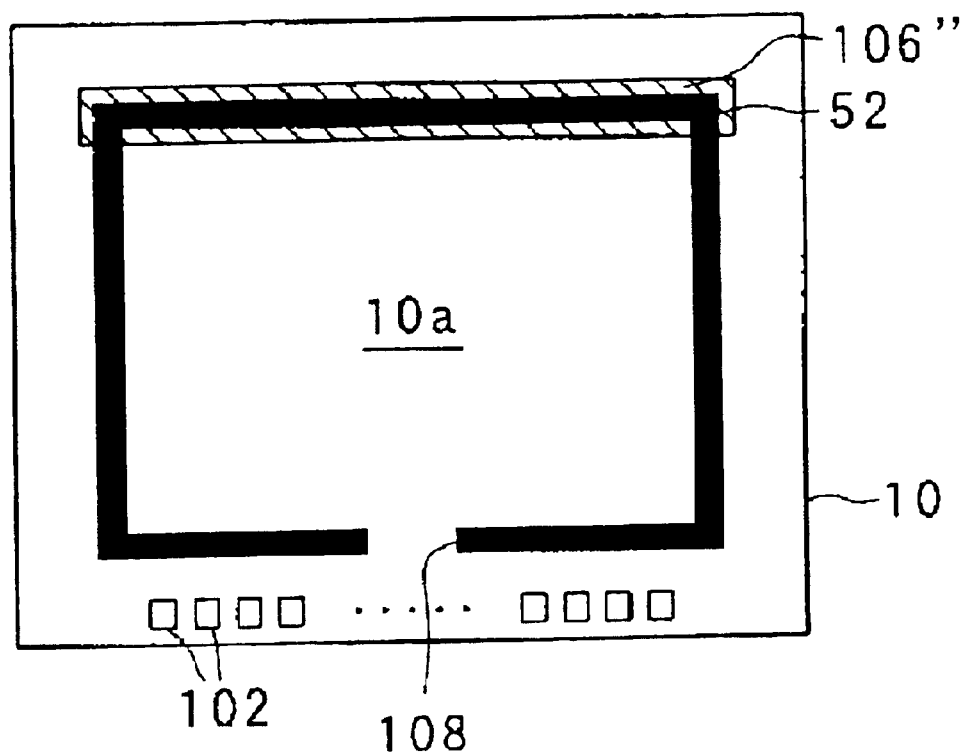
FIG. 5 is a plan view, in the same manner as in FIG. 3, of still another example of the vertically conducting pad and the sealing material which can be used in the embodiment.

As schematically shown in FIGS. 1 and 3, according to the present embodiment, the vertically conducting pad 106 is provided in the sealing region opposing three sides of the rectangular sealing material 52, which has substantially the same shape in plan view as that of the opposing substrate 20, except for the remaining one side at which a liquid crystal inlet 108 is provided. More reliable vertical conduction can be provided via the vertical conducting pad 106 which has an area greater than that of a conventional vertically-conducting-pad. However, vertically conducting pads 106' may be individually provided at two sides of the TFT-arrayed substrate 10 with a side thereof provided with the liquid crystal inlet 108 therebetween, as shown in FIG. 4. A vertically conducting pad 106" may be provided at a side opposite to the side provided with the liquid crystal inlet 108, as shown in FIG. 5.

These vertically conducting pads can be made of metal films having low resistance, such as Al (aluminum) films and/or Cr (chromium) films. A metal film having resistance lower than that of the Al film or nonmetallic electrically conductive material may be used for the vertically conducting pads because they have relatively large areas in contact with the sealing material 52 as vertical conductors.

Figure 6:
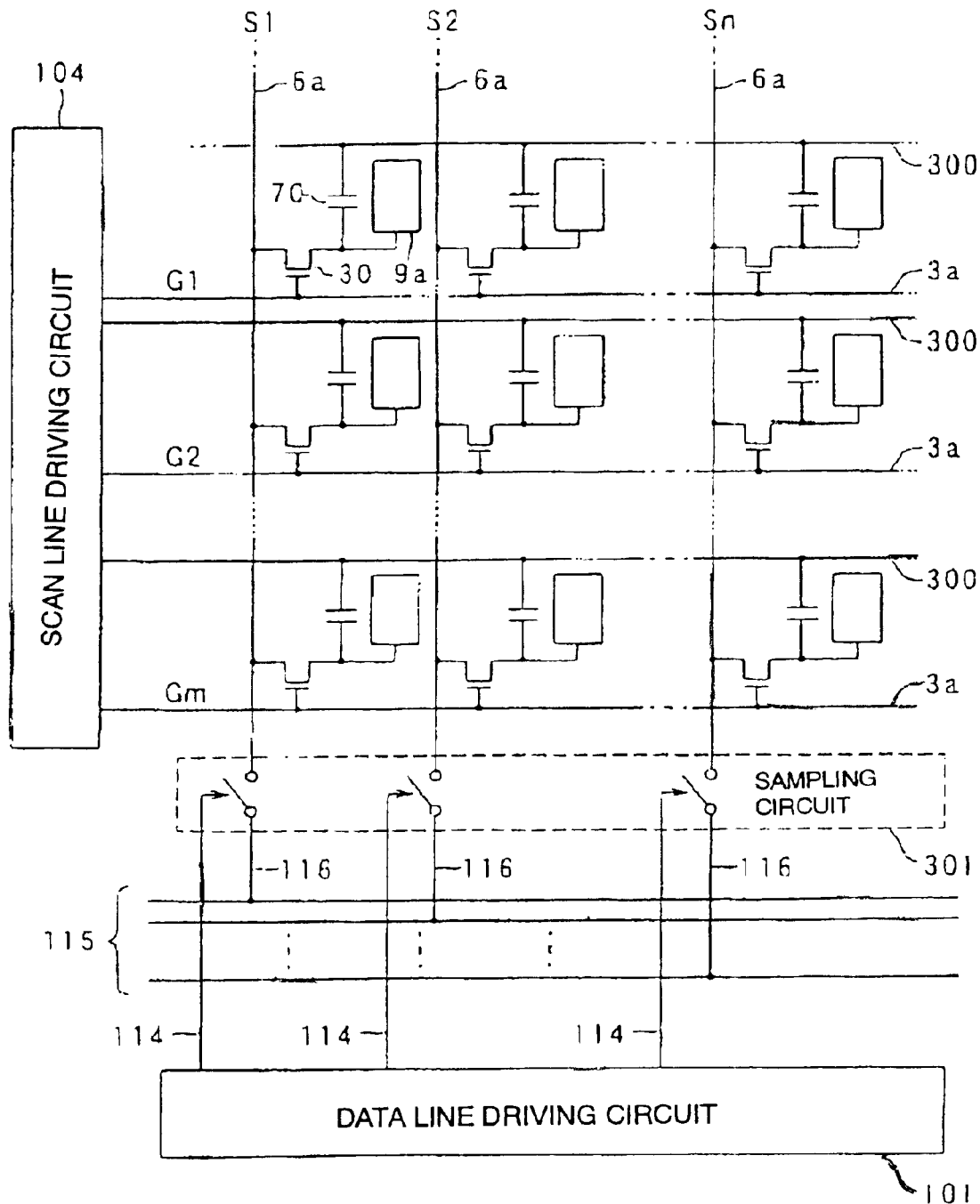
FIG. 6 is a block diagram of various elements and equivalent and peripheral circuits such as wirings provided as a plurality of pixels formed in a matrix, which form an image display region of the electro-optical device according to the embodiment of the present invention.

The configurations and operations of the circuits included in the electro-optical device formed, as described above, are described below with reference to FIG. 6. FIG. 6 is an exemplary block diagram of various elements and equivalent and peripheral circuits such as wirings provided for a plurality of pixels formed in a matrix, which form an image display region of the electro-optical device.

In FIG. 6, the pixel electrode 9a and a TFT 30 for switching the pixel electrode 9a are formed in a section corresponding to each of a plurality of pixels, the plurality of pixels arrayed in a matrix forming an image display region of the electro-optical device according to the present embodiment. Data lines 6a through which image signals are supplied are electrically connected respectively to the sources of the TFTs 30.

Each data line 6a is connected to the drain of a switching element including, for example, a TFT of the sampling circuit 301 at an end (the lower end in FIG. 6) of the data line 6a disposed in the peripheral region of the image display region 10a. Image-signal lines 115 are individually connected to the sources of the TFTs of the sampling circuit 301 via lead wires 116. Sampling-circuit-driving-signal lines 114 connected to the data-line-driving circuit 101 are individually connected to the gates of the TFTs of the sampling circuit 301. Image signals S1, S2, . . . , Sn from the respective image-signal lines 115 are supplied to the data lines 6a by being sampled by the sampling circuit 301 in accordance with the sampling-circuit-driving signals supplied by the data-line-driving circuit 101 via the sampling-circuit-driving-signal lines 114.

The image signals S1, S2, . . . , Sn to be written on the data lines 6a may be supplied in this order, and be supplied in a group to a plurality of the data lines 6a adjacent each other.

Scan lines 3a are electrically connected to the respective gates of the TFTs 30 for switching pixels. Scan signals G1, G2, . . . , Gm are applied in pulses to the respective scan lines 3a in this order at a predetermined timing by the scan-line-driving circuit 104. The pixel electrodes 9a are each electrically connected to the drain of the TFT 30. The image signals S1, S2, . . . , Sn supplied from the data lines 6a are written on the pixel electrodes 9a at a predetermined timing via the TFTs 30 as switching elements which are closed for a predetermined period. The image signals S1, S2, . . . , Sn written on an electro-optical substance such as liquid crystal via the pixel electrodes 9a and having a predetermined level are maintained between the pixel electrodes 9a and the opposing electrode 21 for a predetermined period. The orientation and regularity of liquid-crystal molecules are changed in accordance with the level of applied potential, whereby applied light is modulated and display in gradation is made possible. The transmissivity to incident light decreases in accordance with a voltage applied at each pixel in a normally-white mode, or the transmissivity to the incident light increases in accordance with the voltage applied at each pixel in a normally-black mode, whereby light having a contrast according to the image signals as a whole is emitted from the electro-optical device. In order to avoid leakage of the maintained image signals, a capacitor 70 is provided at each pixel in parallel to the capacitance of the liquid crystal formed between the pixel electrode 9a and the opposing electrode 21. Capacitance lines 300 including a fixed-potential-side capacitance electrode of the capacitor 70 and fixed at constant potential are provided in parallel to the scan lines 3a.

A pre-charge circuit for supplying pre-charge signals having predetermined voltages to a plurality of the data lines 6a before the image signals are supplied may be provided on the TFT-arrayed substrate 10 in addition to the data-line-driving circuit 101, the scan-line-driving circuit 104, the sampling circuit 301, and the like. An inspection circuit and the like may be also provided on the TFT-arrayed substrate 10, for inspection of the quality, defects, and the like of the electro-optical device when manufacturing and shipping the same.

Figure 7:
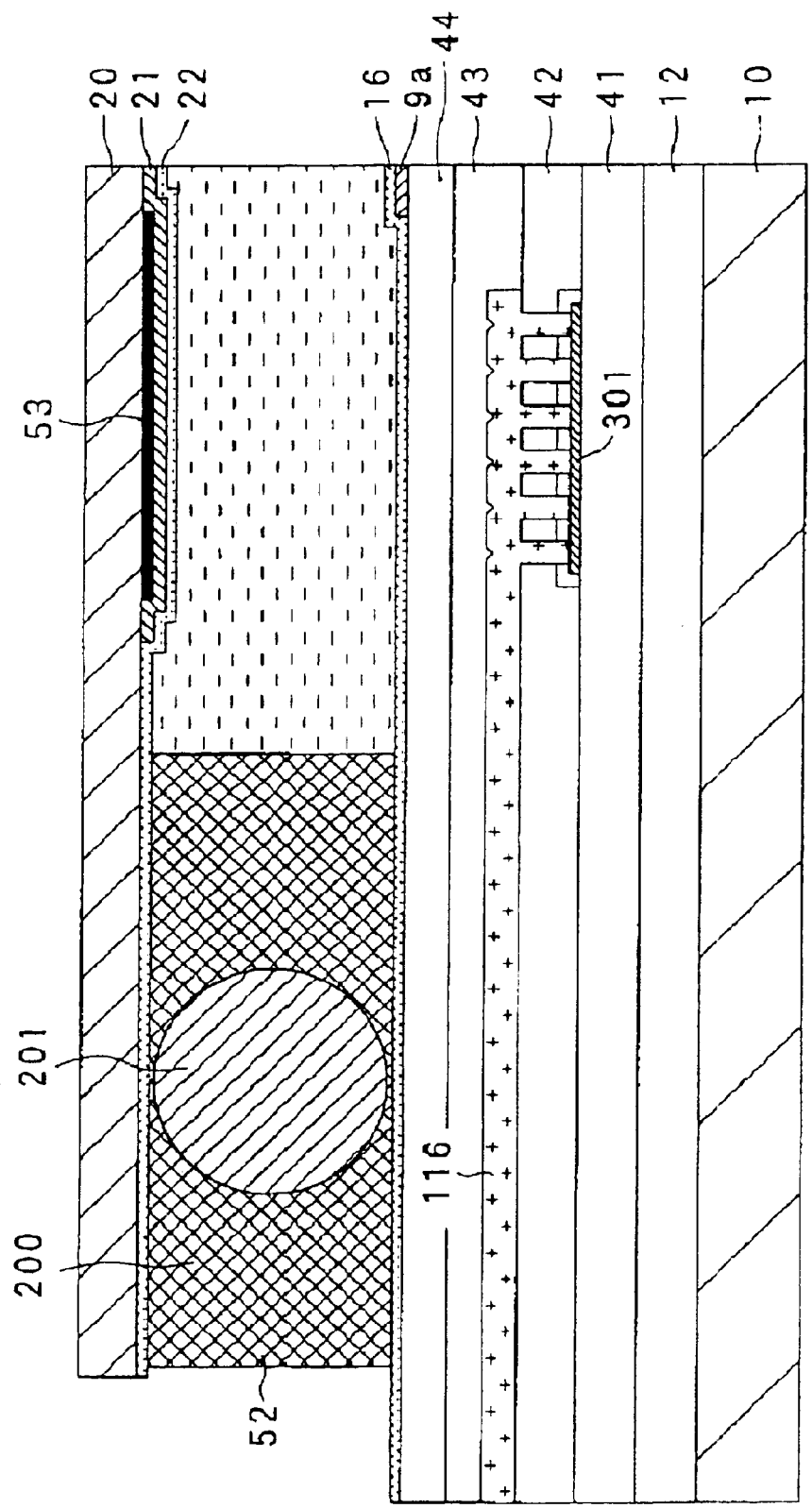
FIG. 7 is an enlarged sectional view of part C1 of FIG. 2.
Figure 8:
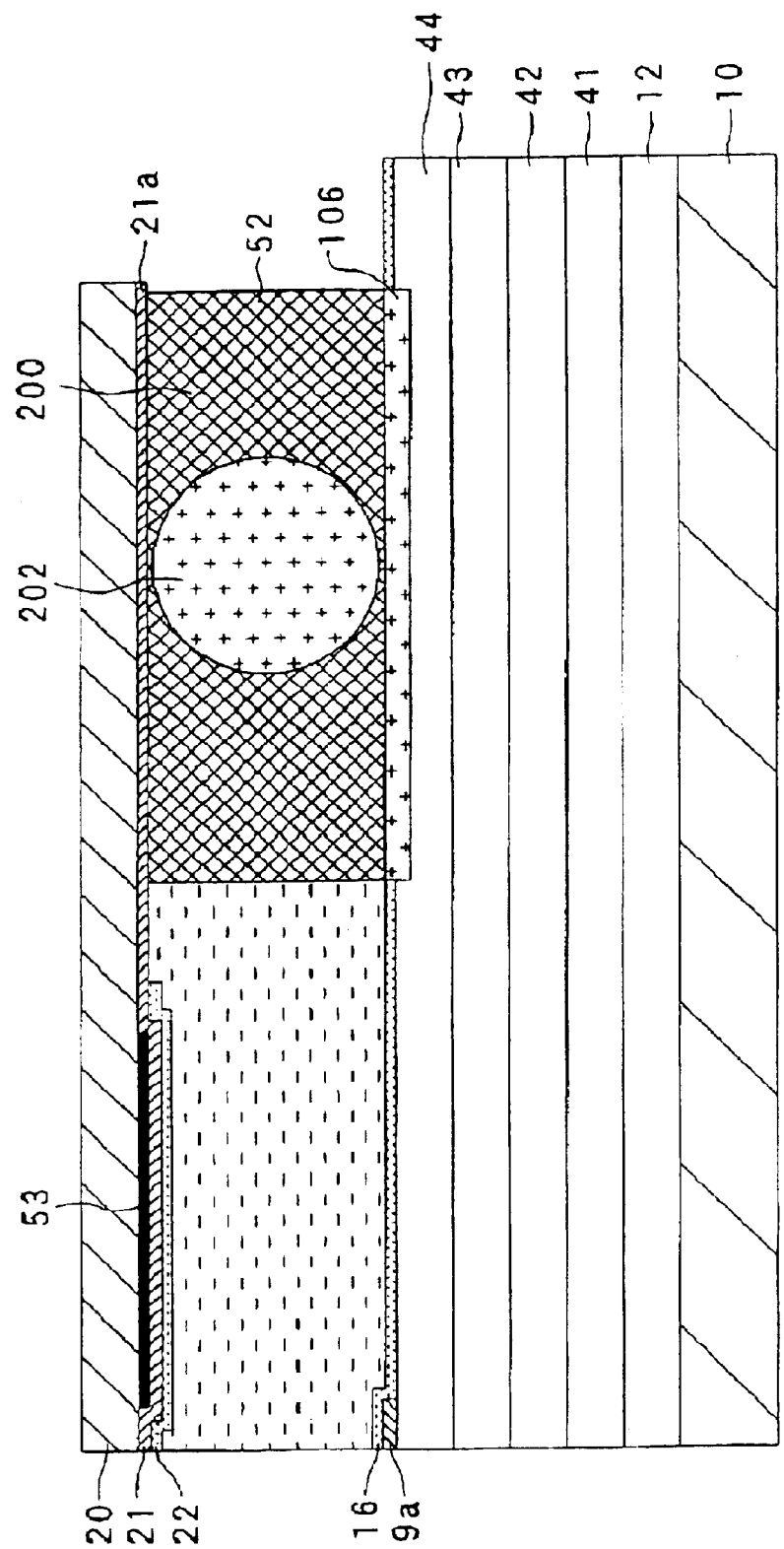
FIG. 8 is an enlarged sectional view of part C2 of FIG. 2.
Figure 9:
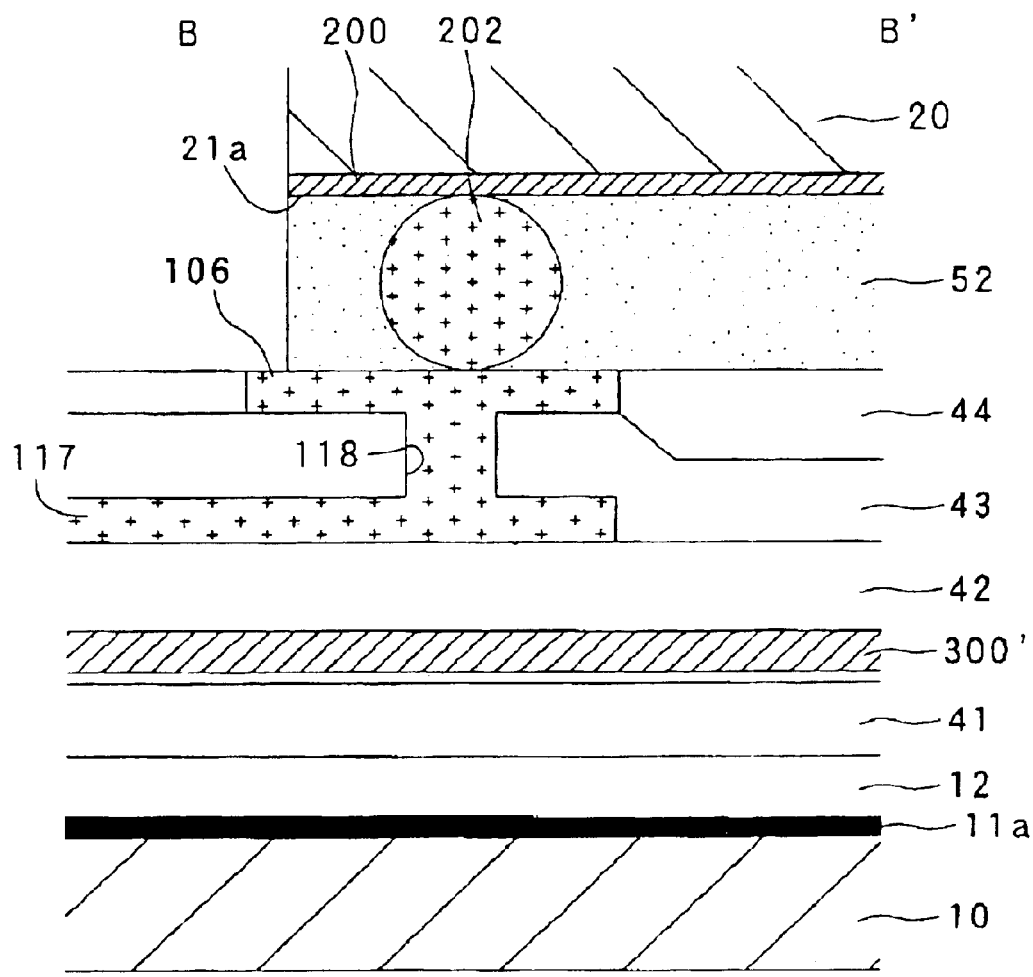
FIG. 9 is a sectional view along line B–B' of FIG. 1.

The configurations, features, and advantages of the sealing material 52 which also serves as a vertical conductor and the vertical conducting pad 106 shown in FIGS. 1 to 5 are further described below with reference to FIGS. 7 to 9. FIG. 7 is an enlarged sectional view of part C1 shown in FIG. 2. FIG. 8 is an enlarged sectional view of part C2 shown in FIG. 2. FIG. 9 is a sectional view along B–B' of the TFT-arrayed substrate and the components shown in FIG. 1.

In FIG. 7, a primary insulation film 12, a first interlayer insulation film 41, a second interlayer insulation film 42, a third interlayer insulation film 43, and a fourth interlayer insulation film 44 for interlayer-insulating the scan lines 3a, the data line 6a, the TFTs, and the like, formed in pixel sections, as described below, from each other are formed in layer on the TFT-arrayed substrate 10. The pixel electrodes 9a and an orientation film 16 are formed on the fourth interlayer insulation film 44. The sampling circuit 301 is formed on the first interlayer insulation film 41 (see FIG. 6), the lead wires 116 formed with the same film (for example, an Al film) as that of the data lines 6a are formed between the second interlayer insulation film 42 and the third interlayer insulation film 43, and the lead wires 116 are individually connected to the sampling circuit 301 (see FIG. 7). The frame 53 and the opposing electrode 21 are formed on the opposing substrate 20. The sealing material 52 including a gap-forming member 201 mixed into a resin 200 is disposed between the orientation film 16 which is an uppermost layer of the TFT-arrayed substrate 10 and an orientation film 22 which is a lowermost layer of the opposing substrate 20.

In FIG. 8, the sealing material 52 including a gap-forming member 202 mixed into the resin 200 is disposed between the vertically conducting pad 106 which is another uppermost layer of the TFT-arrayed substrate 10 and the vertical conductor section 21a formed at an end of the opposing electrode 21 which is another lowermost layer of the opposing substrate 20. The sealing material 52 disposed in the sealing region shown in FIG. 8, unlike the sealing material 52 disposed in the sealing region shown in FIG. 7, includes the gap-forming member 202 which is electrically conductive also serves as a vertical conductor.

Since the gap-forming member 201 shown in FIG. 7 is not conductive, a risk of disconnection or a short circuit of the lead wires 116 and the like can be avoided even when the gap-forming member 201 breaks the interlayer films 44 and 43 and reaches the lead wires 116 which underlie the gap-forming member 201.

In FIG. 9, the vertically conducting pad 106 is connected through a contact hole 118 to an opposing-electrode-signal wire 117 (a wire made of, for example, an Al film or the like in the same way as the lead wires 116) at at least one position on the TFT-arrayed substrate 10, the opposing-electrode-signal wire 117 serving to supply an opposing-electrode-potential signal for causing potential applied to the opposing electrode 21 either to be constant or to invert at a given frequency.

The vertically conducting pad 106 is preferably planarized at the same level as that of the fourth interlayer insulation film 44, as shown in FIG. 9. The planarization is described below in a description of manufacturing processes.

According to the present embodiment, as shown in FIGS. 7 to 9, the sealing material 52, which is used for bonding the substrates to each other in the sealing region and is conductive with the conductive gap-forming member 202 included in the sealing material 52, is disposed between the vertically conducting pad 106 and the vertical conductor section 21a, whereby the sealing material 52 functions as a vertical conductor therebetween. Therefore, the size of the TFT-arrayed substrate 10 can be reduced or the size of an image display region can be increased with respect to the size of the TFT-arrayed substrate 10 because the sealing region includes a vertically conductive region. In other words, the sealing region can be enlarged by the size of the vertically conductive region which is not necessarily prepared independently from the sealing region, whereby the substrates can be very reliably bonded to each other. Moreover, the configuration of the device and manufacturing processes of the same can be made simple, in which at least one part of the sealing material 52 also functions as a vertical conductor.

Figure 10:
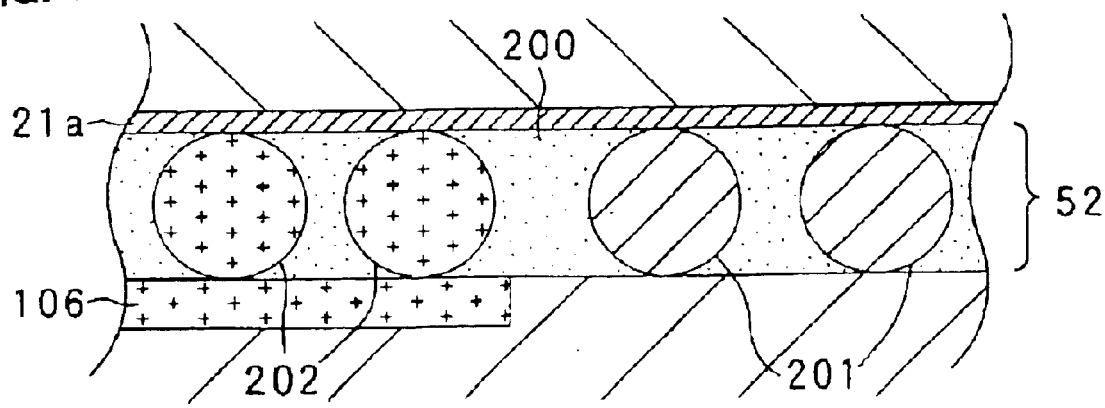
FIG. 10 is a schematic sectional view of gap-forming members in the vicinity of a boundary between a portion of a sealing region in which the vertically conducting pad is formed and another portion of the sealing region in which vertically conducting pad is not formed, according to the embodiment.
Figure 11:
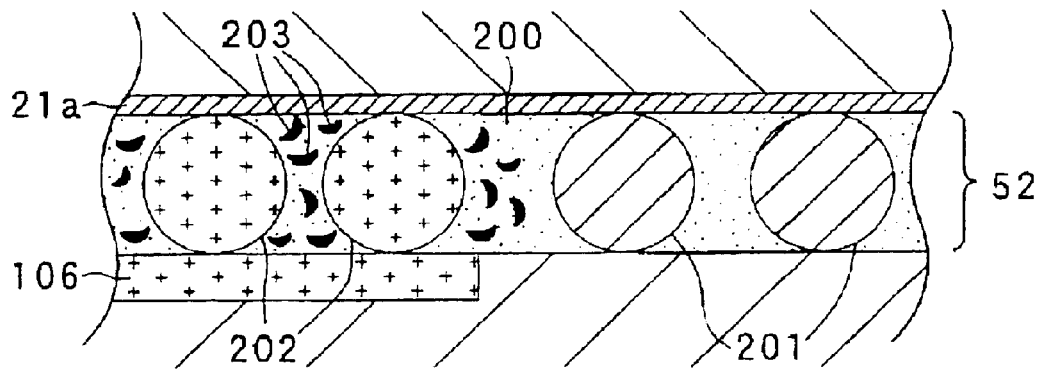
FIG. 11 is a schematic sectional view of the gap-forming members in the vicinity of the boundary between the portion of the sealing region in which the vertically conducting pad is formed and the other portion of the sealing region in which vertically conducting pad is not formed, in a modified example of the embodiment.
Figure 12:
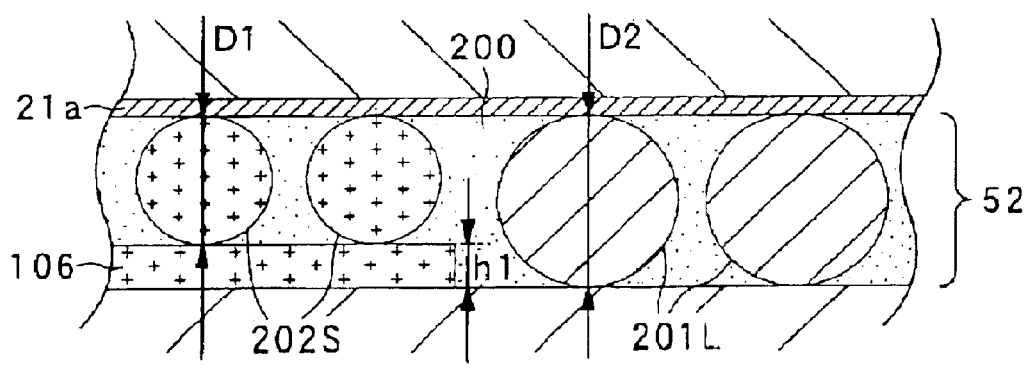
FIG. 12 is a schematic sectional view of the gap-forming members in the vicinity of the boundary between the portion of the sealing region in which the vertically conducting pad is formed and the other portion of the sealing region in which vertically conducting pad is not formed, in another modified example of the embodiment.
Figure 13:
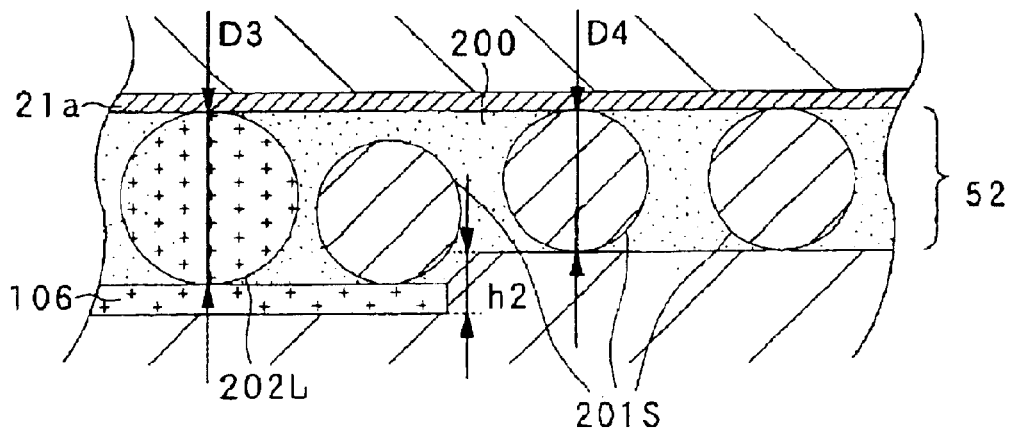
FIG. 13 is a schematic sectional view of the gap-forming members in the vicinity of the boundary between the portion of the sealing region in which the vertically conducting pad is formed and the other portion of the sealing region in which vertically conducting pad is not formed, in another modified example of the embodiment.

Modified examples of the above embodiment are described below with reference to FIGS. 10 to 13. FIG. 10 is a schematic sectional view of gap-forming members disposed in the vicinity of a boundary between a portion of the sealing region, according to the above embodiment, in which the vertically conducting pad is formed and another portion of the sealing region in which vertically conducting pad is not formed. FIGS. 11 to 13 are schematic sectional views of modified examples each including a gap-forming member disposed in the vicinity of the boundary between the portion of the sealing region in which the vertically conducting pad is formed and the other portion of the sealing region in which vertically conducting pad is not formed.

As shown in FIG. 10, the sealing material 52 becomes conductive with the conductive gap-forming member 202 mixed into the resin 200 toward the vertically conducting pad 106 side from the boundary, according to the above embodiment. The sealing material 52 becomes electrically insulative with the electrically insulative gap-forming member 201 mixed into the resin 200 toward the side at which the vertically conducting pad 106 is not provided. The vertically conducting pad 106 is planarized. The diameters of the gap-forming members 201 and 202 are substantially equal to each other. Therefore, according to the above embodiment, the sealing material 52 can function as a vertical conductor in addition to the function as a sealing material, and the gap between the substrates can also be controlled accurately.

In the modified example shown in FIG. 11, conductive powdered silver 203 is mixed into the resin 200 in addition to the conductive gap-forming member 202 toward the side of the vertically conducting pad 106 from the boundary. With this arrangement, the sealing material 52 becomes more conductive. Other configurations are the same as that of the embodiment shown in FIGS. 1 to 9.

In the modified example shown in FIG. 12, the vertically conducting pad 106 is not planarized, and a portion of the sealing region in which the vertically conducting pad 106 is provided is made higher than the region in which the vertically conducting pad 106 is not provided. Therefore, when gap-forming members having the same diameters are disposed at both sides of the boundary, the gap-forming members function only on the vertically conducting pad 106, whereby the gap control cannot be performed accurately. In the modified example shown in FIG. 12, conductive gap-forming members 202S having smaller diameters are disposed on the vertically conducting pad 106 which is disposed relatively high, and electrically insulative gap-forming members 201L having larger diameters are disposed in the relatively low sealing region in which the vertically conducting pad 106 is not provided. A diameter D1 of each smaller-sized gap-forming member 202S is preferably set smaller than a diameter D2 of the larger-sized gap-forming member 201L by a height h1 of the vertically conducting pad 106 (that is, to set to D1=D2−h1). With this arrangement, the control of gap between the substrates can be performed accurately without planarization of the vertically conducting pad 106 of the modified example shown in FIG. 12. Other configuration is the same as that of the embodiment shown in FIGS. 1 to 9.

In the modified example shown in FIG. 13, the vertically conducting pad 106 is not planarized, and a portion of the sealing region in which the vertically conducting pad 106 is provided is made lower than the region in which the vertically conducting pad 106 is not provided. Therefore, when gap-forming members having the same diameters are disposed at both sides of the boundary, only the gap-forming members disposed in the region in which the vertically conducting pad 106 is not provided serve to form a gap, whereby the control of gap cannot be performed reliably.

In the modified example shown in FIG. 13, on the contrary, conductive gap-forming members 202L having larger diameters are disposed on the vertically conducting pad 106 which is disposed relatively low, and electrically insulative gap-forming members 201S having smaller diameters are disposed in the relatively high sealing region in which the vertically conducting pad 106 is not provided. A diameter D3 of each larger-sized gap-forming member 202L is preferably set larger than a diameter D4 of the smaller-sized gap-forming member 201S by a height h2 of the vertically conducting pad 106 (that is, to set to D3=D4+h2). With this arrangement, the control of gap between the substrates can be performed accurately without planarization of the vertically conducting pad 106 of the modified example shown in FIG. 13.

In the modified example shown in FIG. 13, the sealing material 52 including the smaller-sized gap-forming members 201S is also disposed at the boundary at which the size of the gap between the substrates changes. In FIG. 13, one of the smaller-sized gap-forming members 201S is disposed on the vertically conducting pad 106 in a portion of the gap between the substrates where the gap is larger. With this arrangement, a risk in that the larger-sized gap-forming members 202L move into a portion of the gap between the substrates where the gap is smaller from the boundary at which the size of the gap changes can be reduced. That is, a risk of disconnection or short-circuiting of wires due to the larger-sized gap-forming member 202L coming into contact in part with the wires disposed under the smaller-gap portion can be reduced. Other configuration is the same as that of the embodiment shown in FIGS. 1 to 9.

The sealing material 52, as shown in FIGS. 10 to 13, may be formed of a uniform material (that is, including the gap-forming members of the same conductive material, the resin of the same material, the resin of the same conductive material, etc.) to be used for the entire sealing region without being changed in the vicinity of the boundary. With this arrangement, the configuration of the device and manufacturing processes of the same can be made simple with the entire sealing material 52 functioning as a vertical conductor.

Figure 14:
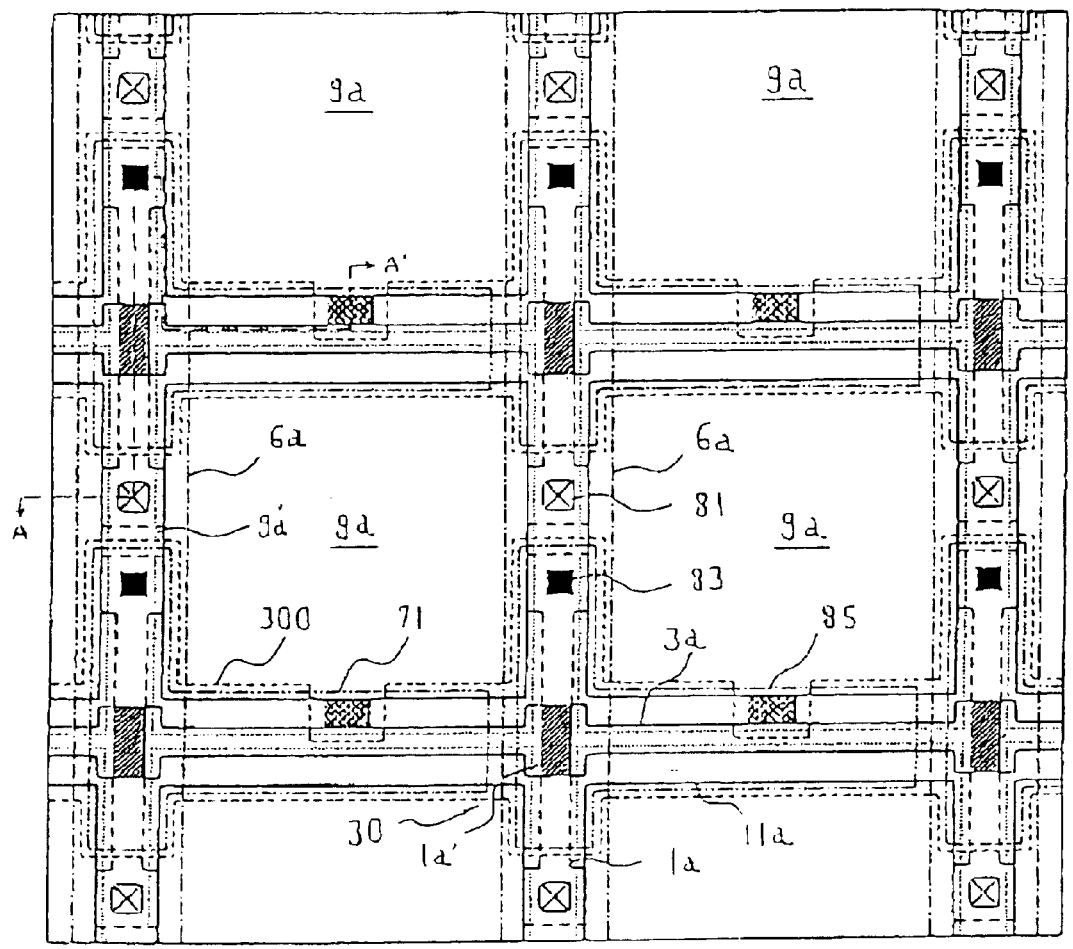
FIG. 14 is a plan view of a plurality of pixels adjacent each other formed on the TFT-arrayed substrate of the electro-optical device according to the embodiment of the present invention, the pixels being provided with data lines, scan lines, pixel electrodes, etc.
Figure 15:
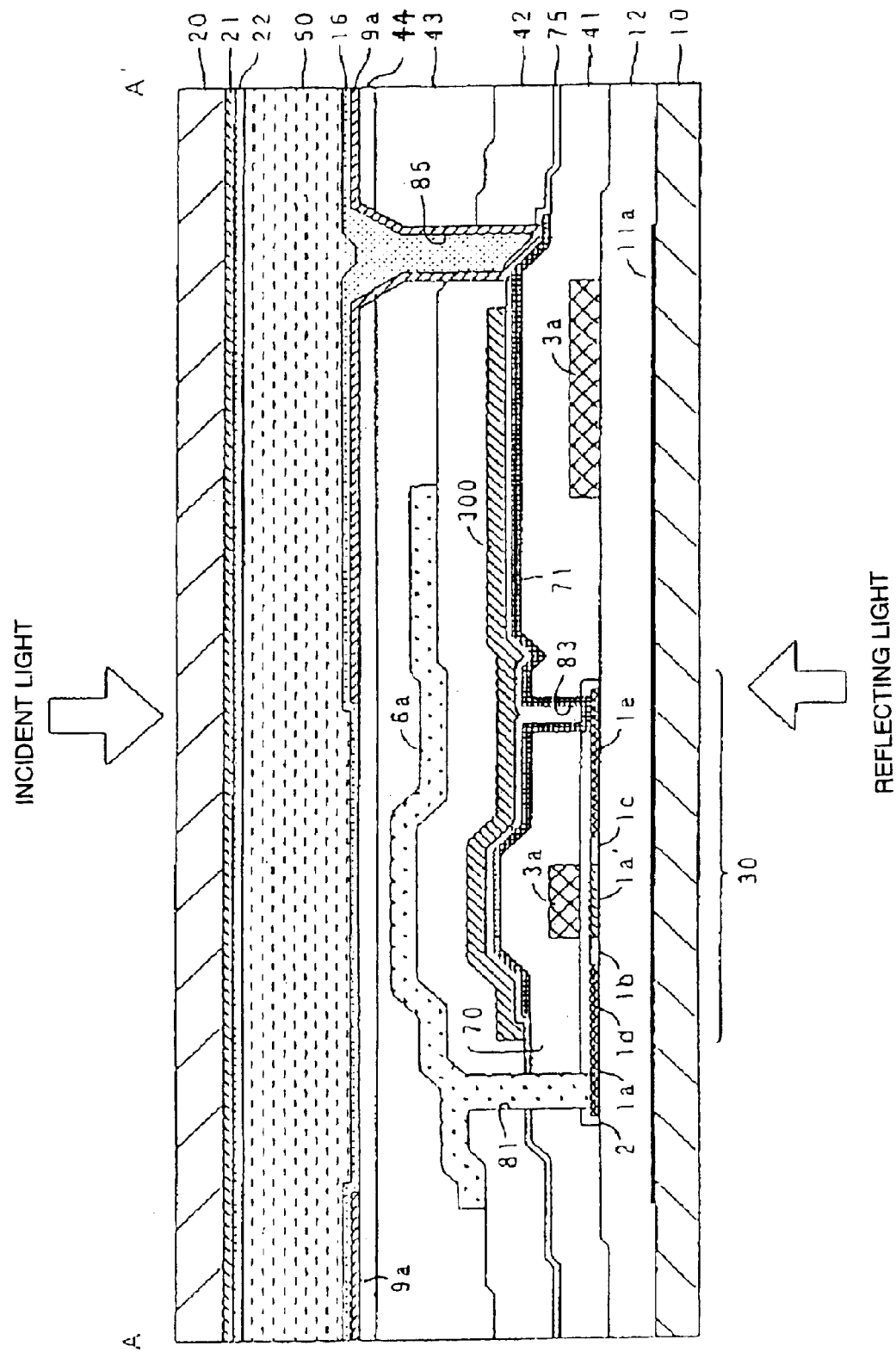
FIG. 15 is a sectional view along line A–A' of FIG. 14.

With reference to FIGS. 14 and 15, the configuration of an image display region of the electro-optical device according to the embodiment of the present invention is described below. FIG. 14 is a plan view of a plurality of pixels adjacent each other provided with data lines, scan lines, pixel electrodes, and the like formed on a TFT-arrayed substrate. FIG. 15 is a sectional view along line A–A' of the plurality of pixels shown in FIG. 14. In FIG. 14, the scales of layers and components differ from each other so that the layers and the components have sizes sufficiently large so as to be recognized in the drawing.

In FIG. 14, a plurality of transparent pixel electrodes 9a (outlines thereof are shown by dotted lines 9a') are provided in a matrix on the TFT-arrayed substrate of the electro-optical device. The data lines 6a and the scan lines 3a are provided along vertical boundaries and horizontal boundaries, respectively, of the pixel electrodes 9a.

Each scan line 3a opposes a channel region 1a', shown by slant lines rising toward the right, of a semiconductor layer 1a shown in the drawing, and functions as a gate electrode (according to the present embodiment in particular, the scan line 3a is formed wide in a portion thereof which is used as the gate electrode). The TFTs 30 for switching pixels are each provided at the intersection between the scan line 3a and the data line 6a, at each of which intersections the scan line 3a as the gate electrode opposes the channel region 1a'.

The capacitors 70 are each formed with a relay layer 71 as a pixel-potential-side-capacitance electrode connected to a heavily doped drain region 1e (and to the pixel electrode 9a) and a part of the capacitance line 300 as a constant-potential-side-capacitance electrode, the relay layer 71 and the part of the capacitance line 300 opposing each other with a dielectric film 75 therebetween.

Each capacitance line 300 extends in a stripe in plan view along the scan line 3a, and protrudes upward and downward in FIG. 14 in a portion of the capacitance line 300 at which the capacitance line 300 crosses the TFT 30. The capacitance line 300 preferably includes a multilayered structure in which a first film having a thickness of approximately 50 nm including a conductive polysilicon film or the like and a second film having a thickness of approximately 150 nm including a metal-silicide film which includes a metal having a high melting point are laminated on each other. With this arrangement, the second film functions as the constant-potential-side-capacitance electrode of the capacitance line 300 or the capacitor 70 and also functions as a light-shielding layer which shields the TFT 30 against incident light from above the TFT 30.

A lower light-shielding film 11a is formed in a lattice-shape under the TFTs 30 and on the TFT-arrayed substrate 10. The lower light-shielding film 11a is made of a metal, an alloy, a metal silicide, a polysilicide, or a layered product of these substances which includes at least one of metals each having a high melting point, such as Ti (titanium), Cr (chromium), W (tungsten), Ta (tantalum), Mo (molybdenum), and Pb (lead).

The data lines 6a extending vertically in FIG. 14 and the capacitance lines 300 extending horizontally in FIG. 14 crossing each other and the lower light-shielding film 11a formed in a lattice-shape define respective open regions of the pixels.

In FIGS. 14 and 15, each data line 6a is electrically connected to a heavily doped source region 1d of the semiconductor layer 1a including, for example, a polysilicon film through a contact hole 81. Another relay layer may be made of the same film as the relay layer 71 described above, and the data line 6a and the heavily doped source region 1d may be electrically connected to each other via the other relay layer and through two contact holes.

Each capacitance line 300 extends from the image display region provided with the pixel electrodes 9a to the periphery of the image display region, is electrically connected to a constant potential source, and is applied with constant potential. The constant potential may be applied by a constant potential source of a positive or negative potential which is supplied to the scan-line-driving circuit for supplying a scan signal for driving the TFTs 30 to the scan lines 3a, and to the data-line-driving circuit for controlling the sampling circuit for supplying image signals to the data lines 6a (see FIGS. 1, 3, and 6). The constant potential may be from a constant potential source for causing potential applied to the opposing substrate 21 of the opposing substrate 20. The lower light-shielding film 11a provided under the TFTs 30 may be connected to the constant potential source by being extended from the image display region to the periphery thereof in the same manner as the capacitance lines 300 so as to avoid a harmful effect of the variations in potential on the TFTs 30.

Each pixel electrode 9a is electrically connected to the heavily doped drain region 1e of the semiconductor layer 1a via the relay layer 71 and through contact holes 83 and 85.

In FIGS. 14 and 15, the electro-optical device includes the TFT-arrayed substrate 10 and the transparent opposing substrate 20 which opposes the TFT-arrayed substrate 10. The TFT-arrayed substrate 10 includes, for example, a quartz substrate, a glass substrate, or a silicon substrate. The opposing substrate 20 includes, for example, a glass substrate or a quartz substrate.

In FIG. 15, the TFT-arrayed substrate 10 is provided with the pixel electrodes 9a and the orientation film 16 disposed on the pixel electrodes 9a, the orientation film 16 being treated for orientation, for example, by rubbing. The pixel electrodes 9a are made of a transparent conductive film such as an ITO film. The orientation film 16 is made of an organic film such as a polyimide film.

The opposing electrode 21 is formed on the entire opposing substrate 20. The orientation film 22 treated for orientation, for example, by rubbing is provided under the opposing electrode 21. The opposing electrode 21 is made of a transparent conductive film such as an ITO film. The orientation film 22 is made of an organic film such as a polyimide film.

The opposing substrate 20 may be provided with a lattice-shaped or a stripe-shaped light-shielding film (a light-shielding film the same as or differing from the frame 53). With this arrangement, incident light from the opposing substrate 20 side can be more reliably prevented from being applied to the channel regions 1a', 20 the lightly doped source regions 1b, and the lightly doped drain region 1c by the light-shielding film on the opposing substrate 20 together with the capacitance lines 300 and the data lines 6a which form a light-shielding region, as described above. Moreover, the light-shielding film formed on the opposing substrate 20 serves to suppress temperature rise in the electro-optical device, at least a surface of the light-shielding film to which incident light is applied being formed of a highly reflective film.

The electro-optical substance which is, for example, liquid crystal is sealed in a space enclosed by the sealing material 52 and between the TFT-arrayed substrate 10 and the opposing substrate 20 thus formed and disposed so that the pixel electrodes 9a and the opposing electrode 21 oppose each other (see FIGS. 1 to 5). Thus, the liquid crystal layer 50 is formed.

The primary insulation film 12 is disposed under the TFTs 30 which perform pixel-switching. The primary insulation film 12 has a function to avoid variations in the characteristic of the pixel-switching TFTs 30 due to a coarse or stained surface of the TFT-arrayed substrate 10 produced by polishing or cleaning, respectively, in addition to the function of interlayer insulation between the lower light-shielding film 11a and the TFTs 30.

In FIG. 15, each pixel-switching TFT 30 includes a LDD (lightly doped drain) structure. The TFT 30 includes the scan line 3a, the channel region 1a' of the semiconductor layer 1a in which a channel is formed by an electric field generated by the scan line 3a, an insulation film 2 including a gate insulation film which insulates between the scan line 3a and the semiconductor layer 1a, the lightly doped source region 1b and the lightly doped drain region 1c of the semiconductor layer 1a, and the heavily doped source region 1d and the heavily doped drain region 1e of the semiconductor layer 1a.

The first interlayer insulation film 41 provided therein with the contact holes 81 communicating with the heavily doped source regions 1d and the contact holes 83 communicating with the heavily doped drain regions 1e is formed on the scan lines 3a.

The relay layer 71 and the capacitance lines 300 are formed on the first interlayer insulation film 41. The second interlayer insulation film 42 provided therein with the contact holes 81 communicating with the heavily doped source regions 1d and the contact holes 85 communicating with the relay layer 71 is formed on the relay layer 71 and the capacitance lines 300.

The data lines 6a are formed on the second interlayer insulation film 42. The planarized third interlayer insulation film 43 provided therein with the contact holes 85 communicating with the relay layer 71 is formed on the data lines 6a and the second interlayer insulation film 42.

The fourth interlayer insulation film 44 which forms the vertically conducting pad 106 in the sealing region is formed on the third interlayer insulation film 43. The pixel electrodes 9a are provided on the thus formed fourth interlayer insulation film 44.

According to the present embodiment, a surface of at least one of the third interlayer insulation film 43 and the fourth interlayer insulation film 44 is planarized by CMP (chemical mechanical polishing) or the like, whereby defective orientation of the liquid crystal in the liquid crystal layer 50 is suppressed, the defective orientation being caused by the difference in level between wirings and/or components disposed under the third and fourth interlayer insulation films 43 and 44.

According to the present embodiment described above, steps produced, along the data lines 6a and the scan lines 3a, on a foundation for the pixel electrodes 9a (that is, the surface of the third interlayer insulation film 43) when a number of conductive layers are formed, as shown in FIG. 15, is reduced by planarization of the surface of the third interlayer insulation film 43. Instead of or in addition to this arrangement, the planarization may be performed by embedding wirings such as the data lines 6a, the TFTs 30, and the like in grooves formed in the TFT-arrayed substrate 10, the primary insulation layer 12, the first interlayer insulation film 41, the second interlayer insulation film 42, or the third interlayer insulation film 43. The planarization may also be performed by polishing by using a CMP method or the like so as to eliminate the steps on the upper face of the second interlayer insulation film 42, or by planarizing the upper face thereof by using an organic SOG (spin on glass).

Although according to the above-described embodiment, the pixel-switching TFT 30 preferably has a LDD structure, as shown in FIG. 15, the TFT 30 may have an offset structure in which the lightly doped source region 1b and the lightly doped drain region 1c are not ion-implanted with impurities, or may be a self-alignment-type TFT in which a highly concentrated impurity is ion-implanted by using the gate electrode as a mask, which is a part of the scan line 3a, and heavily doped source and drain regions are formed in a self-alignment manner. Although according to the present embodiment, the TFT 30 for switching pixels has a single-gate structure in which only one gate is provided between the heavily doped source region 1d and the heavily doped drain region 1e, two or more gates may be provided between the heavily doped source region 1d and the heavily doped drain regions 1e. When the TFT is a dual-gate type or a triple-gate type, or has more gates, leakage current at connected parts between the channel and source regions and the channel and drain regions can be avoided, thereby reducing current consumption during switched-off period.

TFTs for forming the data-line-driving circuit 101, the sampling circuit 301, and the scan-line-driving circuit 104 shown in FIG. 6 can be formed in the same steps as the pixel-switching TFT 30.

Figure 16:
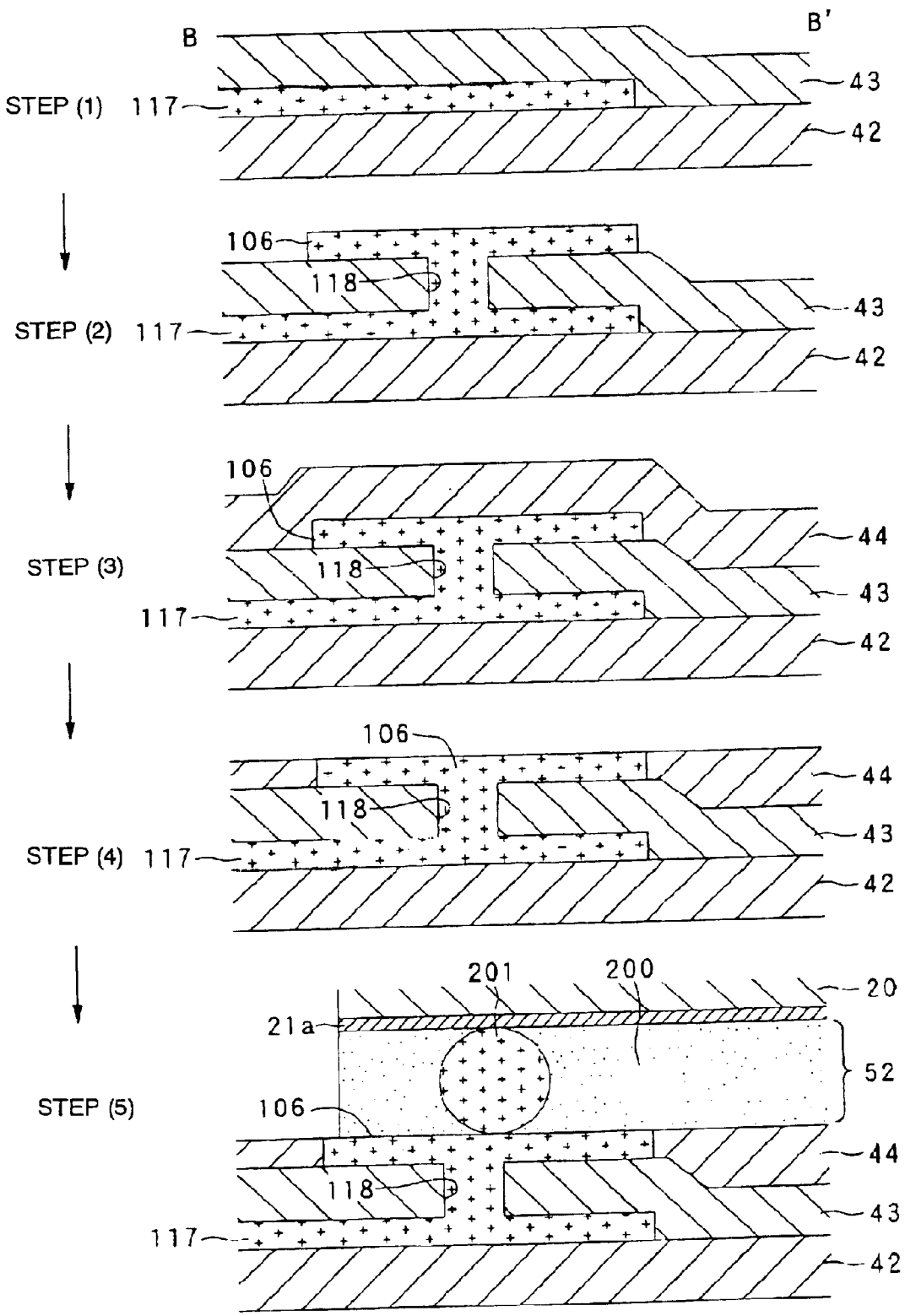
FIG. 16 is an illustration showing manufacturing processes, according to the embodiment of the present invention.

The step of forming the vertically conducting pad and the step of bonding with the seal material, among manufacturing processes of the above-described electro-optical device, are mainly described below with reference to FIG. 16. FIG. 16 includes sectional views, along line B–B' shown in FIG. 1, as in FIG. 9, showing the steps in the order of the manufacturing processes.

In step (1) in FIG. 16, in parallel to the step in which the lower light-shielding film 11a, the semiconductor layer 1a, the scan lines 3a, the capacitance lines 300, the data lines 6a, and the like shown in FIGS. 14 and 15 are deposited in this order on the TFT-arrayed substrate 10, the opposing-electrode-signal wire 117 is formed of the same conductive film as for the above components or of an exclusive conductive film in the sealing region on the TFT-arrayed substrate 10. More in particular, the opposing-electrode-signal wire 117 is formed of the same film (that is, for example, an Al film) as for the data lines 6a (in this case, the lead wires 116 to be disposed under the sealing region, as shown in FIG. 7, can be formed simultaneously). The opposing-electrode-signal wire 117 (also the data lines 6a and the lead wires 116) may be formed, for example, by patterning by photolithography and etching, after an Al film is formed on the overall second interlayer insulation film 42 by sputtering. Interlayer insulation films including the second interlayer insulation film 42 and the third interlayer insulation film 43 may be formed of a silicate glass film such as NSG, PSG, BSG, or BPSG, a silicon nitride film, a silicon oxide film, or the like by an atmospheric or reduced pressure CVD by using TEOS (tetraethyl orthosilicate) gas, TEB (tetraethyl borate) gas, TMOP (tetramethyl oxyphosphate) gas, or the like.

In step (2), the contact hole 118 is formed in the third interlayer insulation film 43 by dry etching, wet etching, or a combination of dry etching and wet etching for electric connection between the opposing-electrode-signal wire 117 and the vertically conducting pad 106. An Al film or the like is then formed on the overall surface of the third interlayer insulation film 43, and is patterned by photolithography and etching, thereby forming the vertically conducting pad 106.

In step (3), an insulation film for forming the fourth interlayer insulation film 44 is formed of a silicate glass film such as NSG, PSG, BSG, or BPSG, a silicon nitride film, a silicon oxide film, or the like by, for example, an atmospheric or reduced pressure CVD in the same manner as the second interlayer insulation film 42 and the third interlayer insulation film 43, the insulation film being formed on the overall surface of the third interlayer insulation film 43 including the vertically conducting pad 106. The thickness of the insulation film is set greater than the thickness of the vertically conducting pad 106.

In step (4), the insulation film formed in the above step (3) is polished by using a CMP method, and the vertically conducting pad 106 is exposed, in which the sealing region including the vertically conducting pad 106 is planarized. More in particular, for example, the surface of the insulation film is polished by rotating the substrate fixed to a spindle and being brought into contact with a polishing pad fixed to a polishing plate while applying a liquid slurry (chemical polishing agent) including silica particles to the polishing pad. When the vertically conducting pad 106 is exposed, the CMP is completed. The CMP is completed, for example, depending on time control, or an appropriate stopper layer which has the same layer-structure as that of the vertically conducting pad 106 may be formed in a predetermined position of the TFT-arrayed substrate 10, whereby the timing of completion of the CMP is determined. The stopper layer may be detected by a friction-detection method in which the variation in friction coefficient produced when the stopper layer is exposed is detected, a vibration-detection method in which vibration generated when the stopper layer is exposed is detected, or an optical method in which the variation in the amount of reflected light produced when the stopper layer is exposed is detected.

In step (5), the pixel electrodes 9a and the orientation film 16 shown in FIGS. 14 and 15 are formed in the image display region of the TFT-arrayed substrate 10. The light-shielding film 53, the opposing electrode 21, and the orientation film 22 are deposited in this order on the opposing substrate 20.

The TFT-arrayed substrate 10 and the opposing substrate 20 which are provided with the layers, as described above, are bonded to each other with the sealing material so that the orientation films 16 and 22 oppose each other (see FIGS. 1 to 5). Immediately before bonding, the sealing region including a vertically conducting pad is applied with the sealing material 52 before curing (that is, the resin 200 before curing including the gap-forming member 201 or gap-forming member 202) by using a dispenser on one of the substrates.

In this case, a dispenser to output the resin 200 before curing including the electrically insulative gap-forming member 201 and another dispenser to output the resin 200 before curing including the conductive gap-forming member 202 are independently prepared. The sealing region not including the vertically conducting pad 106 is formed by using the former dispenser and the sealing region including the vertically conducting pad 106 is formed by using the latter dispenser, whereby a configuration, in which only a portion of the sealing material 52 to serve as a vertical conductor is made conductive, is relatively easily obtainable (see FIGS. 7 to 13).

A dispenser to output the resin 200 before curing including the gap-forming member 201S or 202S which has a smaller diameter and another dispenser to output the resin 200 before curing including the gap-forming member 201L or 202L which has a larger diameter are independently prepared. A portion of the sealing region disposed where the gap between the substrates is smaller is formed by using the former dispenser, and another portion of the sealing region disposed where the gap between the substrates is larger by using the latter dispenser. With this arrangement, a configuration, in which the gap between the substrates can be accurately produced when steps are formed with the vertically conducting pad 106 in the sealing region, is relatively easily obtainable (see FIGS. 12 and 13).

After the substrates are bonded to each other with the sealing material 52, the sealing material 52 (including the resin 200 which is a thermosetting resin or a thermo-photo-curing resin) is cured by being applied with heat or light. According to the present embodiment, light must be applied from the side of the opposing substrate 20 when using a photo-curing resin or an ultraviolet-curing resin, because it is difficult to apply light from the side of the TFT-arrayed substrate 10 due to interference by the vertically conducting pad 106. Therefore, the sealing material 52 including a thermosetting resin or a thermo-photo-curing resin is advantageously used because the sealing material S2 can be reliably cured regardless of the vertically conducting pad 106 (although a photo-curing resin can be cured with sufficient light applied from one side while avoiding deterioration due to light of the electro-optical substance and the like by applying light with the image display region being masked).

Then, for example, liquid crystal including a plurality of types of nematic liquid crystal mixed with each other is drawn by vacuum suction or the like into a space between the substrates through the liquid crystal inlet 108 (see FIG. 1), whereby a liquid crystal layer having a given thickness is formed.

In the manufacturing processes described above, according to the present invention, the electro-optical device according to the present invention can be relatively easily manufactured. Particularly in step (5) shown in FIG. 16, when the TFT-arrayed substrate 10 provided with the vertically conducting pad 106 and the opposing substrate 20 provided with the opposing electrode 21 having the vertical conductor section 21a are bonded to each other with the sealing material 52, a vertical conductor for vertically conducting between the vertically conducting pad 106 and the vertical conductor section 21a can be simultaneously formed of a part of the sealing material 52 including a conductive material. Furthermore, since the sealing region is planarized in step (4) shown in FIG. 16, the gap between the substrates can be accurately controlled by the gap-forming members 201 and 202 included in the seal material 52.

It is noted that the sealing region may be planarized by embedding the vertically conducting pad 106 in a groove formed in the TFT-arrayed substrate 10 or one of the first to third interlayer insulation films, instead of, or in addition to CMP.

The examples of the vertically conducting pad shown in FIGS. 3 to 5 can be advantageously formed simply by slightly modifying patterning performed in step (2) shown in FIG. 16 (that is, they are formed without modifying the other processes).

In the embodiment described above with reference to FIGS. 1 to 16, the data-line-driving circuit 101 and the scan-line-driving circuit 104 may be electrically and mechanically connected to, for example, a driving LSI mounted on a TAB (tape automated bonding) substrate via an anisotropic conductive film which is provided in a peripheral part of the TFT-arrayed substrate 10 instead of providing the data-line-driving circuit 101 and the scan-line-driving circuit 104 on the TFT-arrayed substrate 10. The opposing substrate 20 and the TFT-arrayed substrate 10 are individually provided, at the side of the opposing substrate 20 to which light is applied and the side of the TFT-arrayed substrate 10 from which the light is emitted, with polarizing films, retarder films, polarizing plates, and the like in given directions in accordance with, for example, operational modes such as a TN mode, a VA (vertically aligned) mode, a PDLC (polymer dispersed liquid crystal) mode, and normally white and normally black modes.

Figure 17:
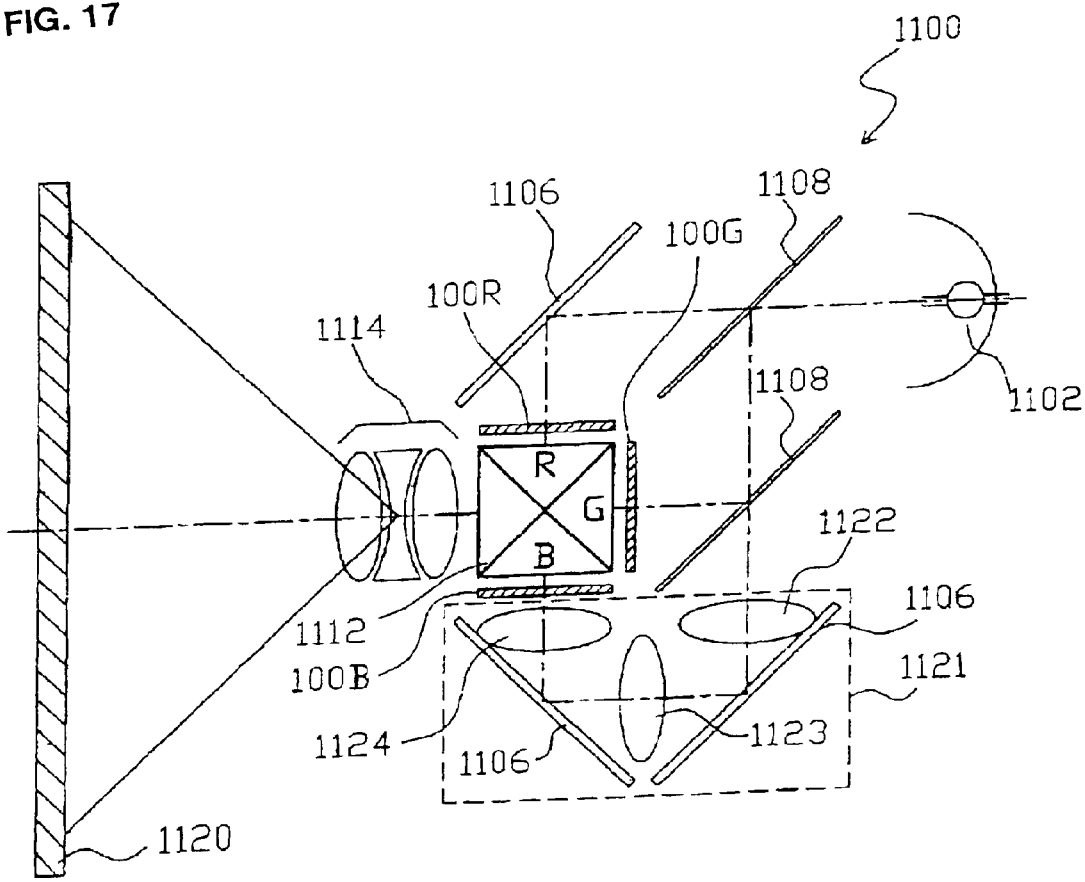
FIG. 17 is an illustration of a projector.

The electro-optical device according to the above embodiments can be used for a projector. A projector using the electro-optical device as a light valve is described below. FIG. 17 is a plan view showing the configuration of the projector. A projector 1100 is provided therein with a lamp unit 1102 including a white light source such as a halogen lamp, as shown in the drawing. Light emitted by the lamp unit 1102 is split into three primary colors R, G, and B by three mirrors 1106 and two dichroic mirrors 1108 disposed in the inside, and the split light is guided to light valves 100R, 100G, and 100B corresponding to the primary colors, respectively. Each of the light valves 100R, 100G, and 100B has the same configuration as that of the electro-optical device according to the embodiments described above, and is driven by a primary color signal R, G, or B which is supplied by a processing circuit (not shown) which receives image signals. Color B which has a light path longer than that of color R or G is led via a relay lens system 1121 including an incident lens 1122, a relay lens 1123, and an emission lens 1124 so as to avoid loss in the amount of light.

The light modulated by the light valves 100R, 100G, and 100B is applied to a dichroic prism 1112 in three directions. Color R and color B are refracted by 90 degrees by the dichroic prism 1112 and color G advances straight therethrough. Respective images in three colors are combined and a combined color image is projected on a screen 1120 by a projection lens 1114.

Since the light to be applied to the light valves 100R, 100G, and 100B is split into three colors R, G, and B by the dichroic mirrors 1108, a color filter is not necessary as described above. The images transmitted by the light valves 100R and 100B are projected after they are reflected by the dichroic mirrors 1112 and the image transmitted by the light valve 100G is projected without being reflected. Therefore, the images from the light valves 100R and 100B to be displayed are horizontally inverted individually with respect to the image from the light valve 100G to be displayed.

Although according to the embodiments, the opposing substrate 20 is not provided with a color filter, RGB color filters together with protective films may be formed on the opposing substrate 20 in given positions opposing the pixel electrodes 9a With this arrangement, the electro-optical device according to the embodiments can be used as a direct-view-type or reflection-type color electro-optical device. A microlens for each pixel may be formed on the opposing substrate 20. A color filter layer of a color resist or the like may be formed under the pixel electrodes 9a associated with colors R, G, and B and on the TFT-arrayed substrate 10. Thus, a bright electro-optical device can be realized with efficiency in condensing incident light being improved. Furthermore, dichroic filters, which form colors R, G, and B by using interference of light produced by a plurality of interference layers having refraction factors differing from each other, may be formed on the opposing substrate 20. By using an opposing substrate provided with the dichroic filters, a brighter color-electro-optical device is obtainable.

It is to be understood that the present invention is not limited to the above-described embodiment and the modified examples thereof, and may be practiced and embodied in manners appropriately modified without departing from the sprit and scope of the present invention, which are apparent from the claims and specification. It is to be understood that an electro-optical device and a method for manufacturing the same with such modifications are also included in the scope of the present invention.

What is claimed is:

1. An electro-optical device comprising:
   an electro-optical substance sandwiched by a pair of a first substrate and a second substrate;
   a sealing material disposed between the first substrate and the second substrate for bonding the first substrate and the second substrate to each other at a sealing region along the peripheries, in plan view, of the first substrate and the second substrate;
   a plurality of pixel electrodes disposed on the first substrate in an image display region which is enclosed, in plan view, by the sealing region;
   wires provided on the first substrate and extending from the inside of the image display region to the outside of the sealing region;
   a vertically conducting pad disposed in the sealing region; and an opposing electrode provided on the second substrate and opposing the pixel electrodes, the opposing electrode including a vertical conductor section which opposes the vertically conducting pad, wherein at least one part of the sealing material, which is disposed between the vertically conducting pad and the vertical conductor section, includes an electrically conductive material the vertically conducting pad occupies at least one of three given sides of the sealing region and is formed at at least one of the four sides of the sealing region at which an inlet for the electro-optical substance is not formed.

2. An electro-optical device comprising:

an electro-optical substance sandwiched by a pair of a first substrate and a second substrate;

a sealing material disposed between the first substrate and the second substrate for bonding the first substrate and the second substrate to each other at a sealing region along the peripheries, in plan view, of the first substrate and the second substrate;

a plurality of pixel electrodes disposed on the first substrate in an image display region which is enclosed, in plan view, by the sealing region;

wires provided on the first substrate and extending from the inside of the image display region to the outside of the sealing region;

a vertically conducting pad disposed in the sealing region; and an opposing electrode provided on the second substrate and opposing the pixel electrodes, the opposing electrode including a vertical conductor section which opposes the vertically conducting pad, wherein at least one part of the sealing material, which is disposed between the vertically conducting pad and the vertical conductor section, includes an electrically conductive material, the sealing material includes a gap-forming member mixed therein for controlling a gap between the first substrate and the second substrate and the gap-forming member includes electrically conductive particles at least in a portion of the sealing material disposed between the vertically conducting pad and the vertical conductor section.

3. An electro-optical device according to claim 2, wherein the electrically conductive particles are metal-plated bead-like or fiber-like particles.

4. An electro-optical device comprising:

an electro-optical substance sandwiched by a pair of a first substrate and a second substrate;

a sealing material disposed between the first substrate and the second substrate for bonding the first substrate and the second substrate to each other at a sealing region along the peripheries, in plan view, of the first substrate and the second substrate;

a plurality of pixel electrodes disposed on the first substrate in an image display region which is enclosed, in plan view, by the sealing region;

wires provided on the first substrate and extending from the inside of the image display region to the outside of the sealing region;

a vertically conducting pad disposed in the sealing region; and an opposing electrode provided on the second substrate and opposing the pixel electrodes, the opposing electrode including a vertical conductor section which opposes the vertically conducting pad, wherein at least one part of the sealing material, which is disposed between the vertically conducting pad and the vertical conductor section, includes an electrically conductive material, the sealing material includes the electrically conductive material at least in a portion of the sealing region opposing the vertically conducting pad and includes an electrically insulative material in the portion of the sealing region not opposing the vertically conducting pad.

5. An electro-optical device comprising:

an electro-optical substance sandwiched by a pair of a first substrate and a second substrate;

a sealing material disposed between the first substrate and the second substrate for bonding the first substrate and the second substrate to each other at a sealing region along the peripheries, in plan view, of the first substrate and the second substrate;

a plurality of pixel electrodes disposed on the first substrate in an image display region which is enclosed, in plan view, by the sealing region;

wires provided on the first substrate and extending from the inside of the image display region to the outside of the sealing region;

a vertically conducting pad disposed in the sealing region; and an opposing electrode provided on the second substrate and opposing the pixel electrodes, the opposing electrode including a vertical conductor section which opposes the vertically conducting pad, wherein at least one part of the sealing material, which is disposed between the vertically conducting pad and the vertical conductor section, includes an electrically conductive material, and a surface of the vertically conducting pad formed in the sealing region is disposed on the same plane as that of a surface of an insulation film formed in the sealing region.

6. An electro-optical device comprising:

an electro-optical substance sandwiched by a pair of a first substrate and a second substrate;

a sealing material disposed between the first substrate and the second substrate for bonding the first substrate and the second substrate to each other at a sealing region along the peripheries, in plan view, of the first substrate and the second substrate;

a plurality of pixel electrodes disposed on the first substrate in an image display region which is enclosed, in plan view, by the sealing region;

wires provided on the first substrate and extending from the inside of the image display region to the outside of the sealing region;

a vertically conducting pad disposed in the sealing region; and an opposing electrode provided on the second substrate and opposing the pixel electrodes, the opposing electrode including a vertical conductor section which opposes the vertically conducting pad, wherein at least one part of the sealing material, which is disposed between the vertically conducting pad and the vertical conductor section, includes an electrically conductive material, and a surface of the vertically conducting pad formed in the sealing region is disposed at a level differing from the level of a surface of an insulation film formed in the sealing region, and the sealing material includes gap-forming members having diameters differing from each other in accordance with the size of a gap between the first substrate and the second substrate, the size of the gap varying between a portion of the sealing region in which the vertically conducting pad is formed and another portion of the sealing region in which the insulation film is formed so as to control the gap between the first substrate and the second substrate.

7. An electro-optical device according to claim 6, wherein the sealing material including the gap-forming member which has a smaller diameter corresponding to the gap of a smaller size is disposed in a part of the sealing region associated with the gap of a larger size and in the vicinity of a boundary, at which the size of the gap varies, between the portion of the sealing region in which the vertically conducting pad is formed and the other portion of the sealing region in which the insulation film is formed.

8. A method for manufacturing an electro-optical device, having an electro-optical substance sandwiched by a pair of a first substrate and a second substrate;
   a sealing material disposed between the first substrate and the second substrate for bonding the first substrate and the second substrate to each other at a sealing region along the peripheries, in plan view, of the first substrate and the second substrate;
   a plurality of pixel electrodes disposed on the first substrate in an image display region which is enclosed, in plan view, by the sealing region;
   wires provided on the first substrate and extending from the inside of the image display region to the outside of the sealing region;
   a vertically conducting pad disposed in the sealing region; and
   an opposing electrode provided on the second substrate and opposing the pixel electrodes, the opposing electrode including a vertical conductor section which opposes the vertically conducting pad,
   wherein at least one part of the sealing material, which is disposed between the vertically conducting pad and the vertical conductor section, includes an electrically conductive material, the method comprising the steps of:
      forming the pixel electrodes, the wires, and the vertically conducting pad on the first substrate;
      forming the opposing electrode on the second substrate; and
      bonding the first substrate and the second substrate to each other with the sealing material, wherein the step of bonding with the sealing material comprises the steps of applying the sealing material including a gap-forming member having a first diameter to a portion of the sealing region opposing the vertically conducting pad by using a dispenser, and applying the sealing material including another gap-forming member having a second diameter to another portion of the sealing region not opposing the vertically conducting pad by using another dispenser, the second diameter differing from the first diameter.

9. A method for manufacturing an electro-optical device, having an electro-optical substance sandwiched by a pair of a first substrate and a second substrate;
   a sealing material disposed between the first substrate and the second substrate for bonding the first substrate and the second substrate to each other at a sealing region along the peripheries, in plan view, of the first substrate and the second substrate;
   a plurality of pixel electrodes disposed on the first substrate in an image display region which is enclosed, in plan view, by the sealing region;
   wires provided on the first substrate and extending from the inside of the image display region to the outside of the sealing region;
   a vertically conducting pad disposed in the sealing region; and
   an opposing electrode provided on the second substrate and opposing the pixel electrodes, the opposing electrode including a vertical conductor section which opposes the vertically conducting pad,
   wherein at least one part of the sealing material, which is disposed between the vertically conducting pad and the vertical conductor section, includes an electrically conductive material, the method comprising the steps of:
      forming the pixel electrodes, the wires, and the vertically conducting pad on the first substrate;
      forming the opposing electrode on the second substrate; and
      bonding the first substrate and the second substrate to each other with the sealing material, wherein the step of bonding with the sealing material comprises the steps of applying the sealing material including an electrically conductive gap-forming member to a portion of the sealing region opposing the vertically conducting pad by using a dispenser, and applying the sealing material including an electrically insulative gap-forming member to another portion of the sealing region not opposing the vertically conducting pad by using another dispenser.

10. An electro-optical device, comprising:
    a first substrate including
       a plurality of pixel electrodes disposed in an image display region,
       a plurality of data lines supplying image signals to the pixel electrodes,
       a data line driving circuit,
       a sampling circuit which supplies the image signals to the data lines in accordance with sampling-circuit-driving-signals supplied from the data line driving circuit, and
       a plurality of lead wires electrically connected between image signal lines and the sampling circuit, disposed between the data line driving circuit and the sampling circuit;
    a second substrate including an opposing electrode;
    an electro-optical substance sandwiched by the first substrate and the second substrate;
    a sealing material disposed between the first substrate and the second substrate that bonds the first substrate and the second substrate to each other at a sealing region along the periphery of the image display region that includes a region of the lead wires;
    a vertically conducting pad supplying an opposing-electrode potential-signal to the opposing electrode, faced with at least one of three sides in which the region of the lead wires of the sealing region above the first substrate is not formed;
    a vertical conductor section opposing the vertically conducting pad above the second substrate;
    a conductive gap-forming member mixed into the sealing material that is disposed between the vertically conducting pad and the vertical conductor section; and
    a non-conductive gap-forming member mixed into the sealing material in the region of the lead wires.

* * * * *